(12) United States Patent
Deng et al.

(10) Patent No.: US 8,933,637 B2
(45) Date of Patent: Jan. 13, 2015

(54) AC/DC POWER CONVERTER

(71) Applicant: Silergy Semiconductor Technology (Hangzhou) Ltd, Hangzhou, ZheJiang Province (CN)

(72) Inventors: Jian Deng, Hangzhou (CN); Binbin Li, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 17 days.

(21) Appl. No.: 13/763,796

(22) Filed: Feb. 11, 2013

(65) Prior Publication Data

US 2014/0117865 A1    May 1, 2014

(30) Foreign Application Priority Data

Oct. 31, 2012 (CN) .......................... 2012 1 0428797

(51) Int. Cl.
*H05B 37/00* (2006.01)
*H05B 33/08* (2006.01)
*H02M 1/42* (2007.01)
*H02M 1/32* (2007.01)
*H02M 1/00* (2006.01)

(52) U.S. Cl.
CPC ......... *H05B 33/0839* (2013.01); *H02M 1/4225* (2013.01); *H02M 1/4258* (2013.01); *Y02B 70/126* (2013.01); *H02M 1/32* (2013.01); *H02M 2001/0009* (2013.01); *H02M 2001/007* (2013.01); *Y02B 20/348* (2013.01)
USPC ......... 315/200 R; 323/247; 363/108; 363/47; 315/212; 315/205

(58) Field of Classification Search
CPC ........................... F21Y 2101/02; Y10S 362/80
USPC ........................................... 315/200; 363/108
See application file for complete search history.

(56) References Cited

U.S. PATENT DOCUMENTS

| | | | | |
|---|---|---|---|---|
| 5,790,389 A * | 8/1998 | Hua | ............................ | 363/20 |
| 6,005,780 A * | 12/1999 | Hua | ............................ | 363/20 |
| 6,069,801 A * | 5/2000 | Hodge et al. | ................. | 363/21.02 |
| 7,641,358 B1 * | 1/2010 | Smith et al. | .................... | 362/183 |
| 8,035,307 B2 * | 10/2011 | Chew | ........................... | 315/200 R |
| 8,054,008 B2 * | 11/2011 | Kimura | ........................ | 315/307 |
| 8,076,920 B1 * | 12/2011 | Melanson | ..................... | 323/299 |
| 8,330,382 B2 * | 12/2012 | Komatsu | ....................... | 315/224 |
| 2010/0225239 A1 * | 9/2010 | King | ............................ | 315/224 |
| 2010/0295458 A1 * | 11/2010 | Cheng et al. | ............... | 315/185 R |
| 2011/0157940 A1 * | 6/2011 | Zhang | .......................... | 363/126 |
| 2012/0025725 A1 * | 2/2012 | Kimura | ........................ | 315/201 |

* cited by examiner

*Primary Examiner* — Douglas W Owens
*Assistant Examiner* — Srinivas Sathiraju
(74) *Attorney, Agent, or Firm* — Michael C. Stephens, Jr.

(57) ABSTRACT

In one embodiment, an AC/DC power converter can include: a rectifier bridge and a filter capacitor for converting an external AC voltage to a half-sinusoid DC input voltage; a first storage component, where during each switching cycle in a first operation mode, a first path receives the half-sinusoid DC input voltage to store energy in the first storage component, and a first current through the first storage component increases; a second storage component, where a second path receives a second DC voltage to store energy in the second storage component, and a second current through the second storage component increases; and a third storage component, where in a second operation mode, the first current decreases to release energy from the first to the third storage component, where the second DC voltage includes a voltage across the third storage component through a third path.

19 Claims, 26 Drawing Sheets

US 8,933,637 B2

AC/DC POWER CONVERTER

RELATED APPLICATIONS

This application claims the benefit of Chinese Patent Application No. 201210428797.6, filed on Oct. 31, 2012, which is incorporated herein by reference in its entirety.

FIELD OF THE INVENTION

The present invention generally pertains to an electronic technology, and more particularly to an AC/DC power converter.

BACKGROUND

AC/DC power converters used to convert an AC voltage to a constant DC electric signal (DC voltage and/or DC current) are widely applied to drive loads of relatively high power (e.g., electric motors, light-emitting diode [LED] lamps, etc.). A rectifying bridge is usually configured in an AC/DC power converter to convert an external AC voltage to a half-sinusoid DC voltage for a subsequent converting circuit. Also, a power factor correction (PFC) circuit may be utilized in an AC/DC power converter to achieve power factor correction to obtain a relatively high power factor.

SUMMARY

In one embodiment, an AC/DC power converter can include: (i) a rectifier bridge and a filter capacitor configured to convert an external AC voltage to a half-sinusoid DC input voltage; (ii) a first storage component, where during each switching cycle in a first operation mode, a first path is configured to receive the half-sinusoid DC input voltage to store energy in the first storage component, and a first current flowing through the first storage component is configured to increase; (iii) a second storage component, where a second path is configured to receive a second DC voltage to store energy in the second storage component, and a second current flowing through the second storage component is configured to increase, where the first and second paths share a power switch; (iv) a third storage component, where in a second operation mode, the first current is configured to decrease to release energy from the first storage component to the third storage component, where the second DC voltage includes a voltage across the third storage component through a third path; (v) where the energy stored in the second storage component is configured to be released to a load through a fourth path; and (vi) where a duration of the first operation mode is maintained such that a peak value of the first current is in direct proportion to the half-sinusoid DC input voltage, and an output electrical signal of the AC/DC power converter is maintained as pseudo constant.

Embodiments of the present invention can advantageously provide several advantages over conventional approaches. For example, particular embodiments can provide a simplified AC/DC power converter structure to achieve a higher power factor and a substantially constant output electrical signal. Other advantages of the present invention may become readily apparent from the detailed description of preferred embodiments below.

BRIEF DESCRIPTION OF THE DRAWINGS

FIG. 7C shows example conduction paths of the AC/DC power converter of FIG. 7A when the power switch and a diode are turned on.

FIG. 7D shows example conduction paths of the AC/DC power converter of FIG. 7A when the power switch and another diode are on.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
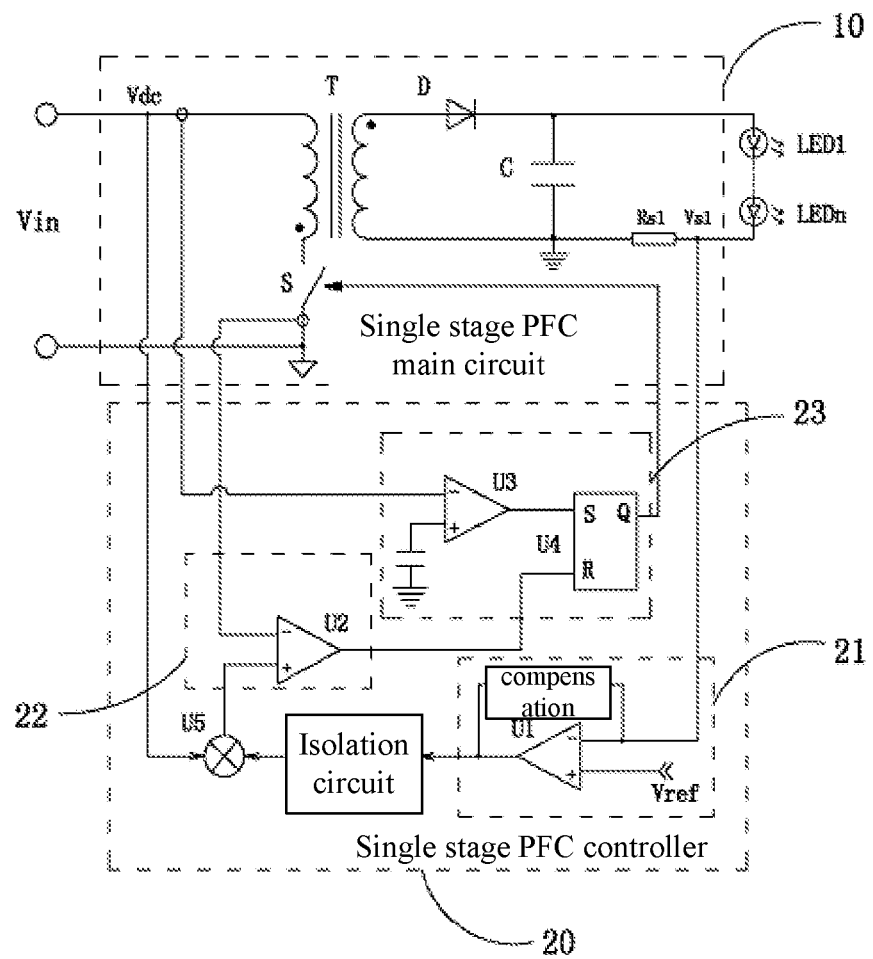
FIG. 1 shows a schematic diagram of an example single stage AC/DC power converter.

Either single stage converter or two stages converter can be used achieve power factor correction (PFC), and a substantially constant output electric signal. With reference to FIG. 1, an example single stage AC/DC power converter is shown. The single stage AC/DC power converter can include single stage PFC main circuit 10 implemented as a flyback topology. Also, single stage PFC controlling circuit 20 can include closed loop current controlling circuit 21, current controlling circuit 22, zero-crossing trigger circuit 23, isolation circuit, and multiplier U5.

The output current of single stage PFC main circuit 10 may be sampled by closed loop current controlling circuit 21, the output of which can be isolated by an isolation circuit. The input voltage Vdc and the output of the isolation circuit can be multiplied through multiplier U5, the output of which can be coupled to a non-inverting input terminal of current controlling circuit 22. The inverting terminal of the current controlling circuit 22 can receive the input current. The output of current controlling circuit 22 can be coupled to zero-crossing trigger circuit 23, which can include voltage comparator U3 and RS flip-flop U4. The output of current controlling circuit 22 can be coupled to the reset terminal R, and the output of voltage comparator U3 can be coupled to the set terminal S of RS flip-flop U4.

The on and off operation of switch S maybe controlled by the output signal of RS flip-flop U4 such that the input current is in phase with the input voltage, to improve the power factor of the single stage PFC circuit. However, "ripple" waves may exist in the output current utilising the example implementation of FIG. 1. Further, the larger the ripple wave is, the larger the error of the output current is. The input current may not follow the input voltage due to a larger error of the input current, which can decrease the power factor.

Figure 2:
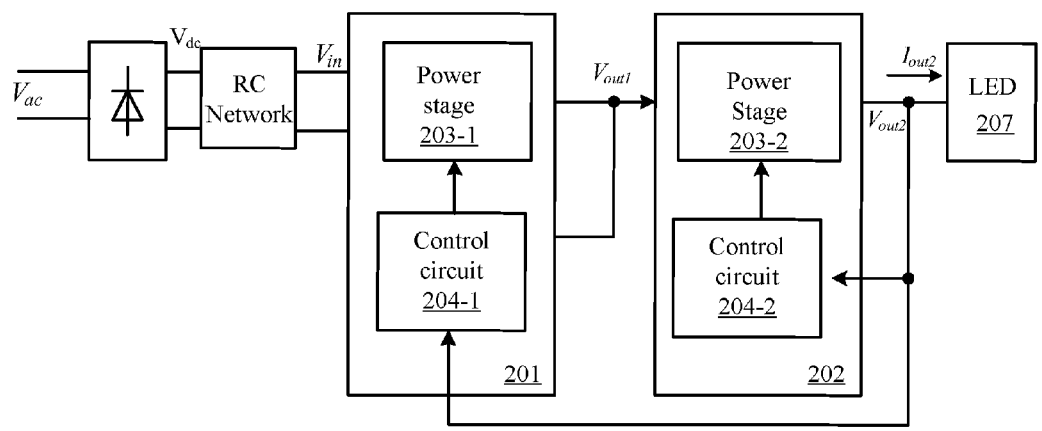
FIG. 2 shows a schematic diagram of an example two stage AC/DC power converter.

Referring now to FIG. 2, a schematic diagram of an example AC/DC power converter with two stages (201 and 202) is shown. In this example, the AC/DC power converter can include power stages 203-1 and 203-2, and control circuits 204-1 and 204-2. Power stage 203-1 can be controlled by control circuit 204-1 such that the input current follows a half-sinusoid DC input voltage coupled to power stage 203-1 to achieve power factor correction. Power stage 203-2 can receive output voltage $V_{out1}$ of stage 201. Also, power stage 203-2 can be controlled by control circuit 204-2 to maintain a substantially constant output current to drive light-emitting diode (LED) load 207.

Improved harmonic wave performance and a higher power factor can be achieved by the example AC/DC power converter of FIG. 2. The DC voltage input to a DC/DC stage can be pre-regulated by the independent PFC stage to make the output voltage more accurate, and the loading capacitor may provide an improvement that can be applied to higher power application. However, there are at least two control circuits, and at least two power switches, possibly resulting in more components, higher costs, lower power efficiency, and higher power losses. Thus, the particular example AC/DC power converter of FIG. 2 may not be suitable for some low and medium power applications.

In one embodiment, an AC/DC power converter can include: (i) a rectifier bridge and a filter capacitor configured to convert an external AC voltage to a half-sinusoid DC input voltage; (ii) a first storage component, where during each switching cycle in a first operation mode, a first path is configured to receive the half-sinusoid DC input voltage to store energy in the first storage component, and a first current flowing through the first storage component is configured to increase; (iii) a second storage component, where a second path is configured to receive a second DC voltage to store energy in the second storage component, and a second current flowing through the second storage component is configured to increase, where the first and second paths share a power switch; (iv) a third storage component, where in a second operation mode, the first current is configured to decrease to release energy from the first storage component to the third storage component, where the second DC voltage includes a voltage across the third storage component through a third path; (v) where the energy stored in the second storage component is configured to be released to a load through a fourth path; and (vi) where a duration of the first operation mode is maintained such that a peak value of the first current is in direct proportion to the half-sinusoid DC input voltage, and an output electrical signal of the AC/DC power converter is maintained as pseudo constant.

Figure 3A:
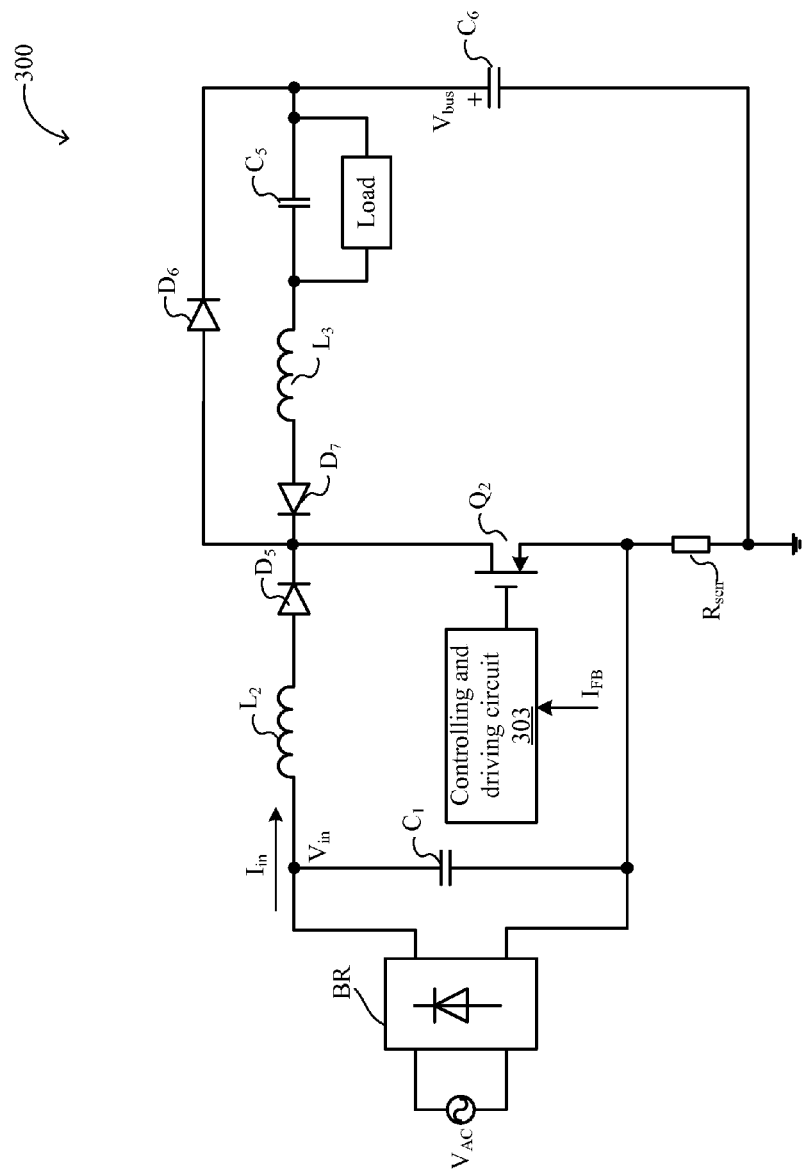
FIG. 3A shows a schematic diagram of a first example AC/DC power converter in accordance with embodiments of the present invention.

Referring now to FIG. 3A, shown is a schematic diagram of a first example AC/DC power converter in accordance with embodiments of the present invention. External AC voltage $V_{AC}$ can be rectified and filtered by a rectifier bridge and capacitor $C_1$ to generate half-sinusoid DC input voltage $V_{in}$ across capacitor $C_1$. AC/DC power converter 300 can include inductor $L_2$ (first energy storage component), inductor $L_3$ (second energy storage component) and capacitor $C_6$ (third energy storage component). The periods of energy storage and energy dissipation of inductor $L_2$, inductor $L_3$, and capacitor $C_6$ may be controlled through different paths to achieve higher power factor and a substantially constant output electrical signal by virtue of the characteristics of the various energy storage components.

Figure 3B:
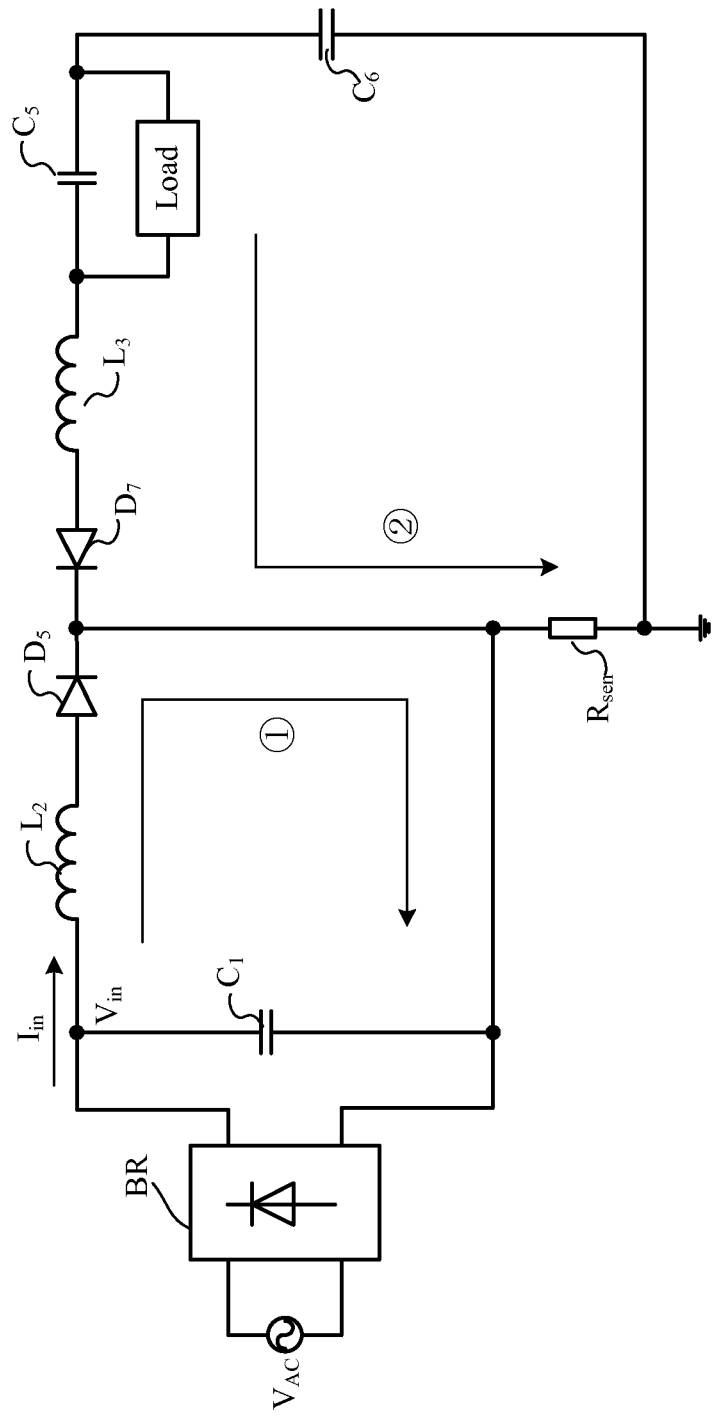
FIG. 3B shows an example conductive path of the AC/DC power converter of FIG. 3A during a first operation mode.

With reference to FIG. 3B, an example conductive path of the AC/DC power converter in a first operation mode is shown, where power switch $Q_2$ is turned on. In a first path (denoted by an encircled 1) can include inductor $L_2$, power switch $Q_2$, and capacitor $C_1$. As inductor current $i_{L2}$ of inductor $L_2$ continues to increase, energy can be stored in inductor $L_2$. Simultaneously, in a second path (denoted by an encircled 2), which can include inductor $L_3$, power switch $Q_2$ and capacitor $C_6$, the inductor current of inductor $L_3$ can continue to increase, and energy may be stored in inductor $L_3$.

Figure 3C:
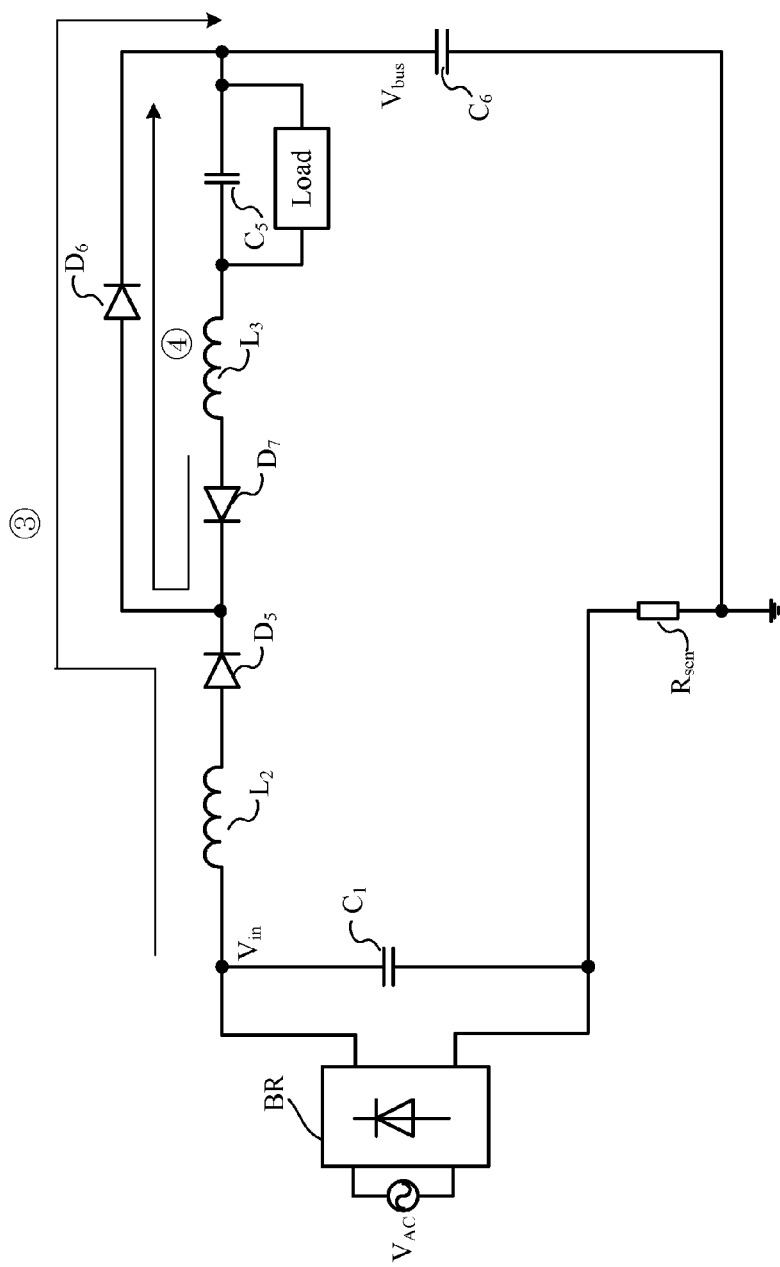
FIG. 3C shows an example conductive path of the AC/DC power converter of FIG. 3A during a second operation mode.

With reference to FIG. 3C, an example conductive path of the AC/DC power converter in a second operation mode is shown, where power switch $Q_2$ is turned off. In a third path (denoted by an encircled 3), which can include inductor $L_2$, diode $D_6$, and capacitor $C_6$, inductor current $i_{L2}$ flowing through inductor $L_2$ can continue to decrease to release energy, which may be transferred to capacitor $C_6$ by charging. If the capacitance of capacitor $C_6$ is sufficiently large, the voltage across capacitor $C_6$ can maintain a substantially constant value with little fluctuation. Simultaneously, the inductor current of inductor $L_3$ can continue to decrease, and the energy of which may be released to the load through the fourth path (denoted by an encircled 4), which can include inductor $L_3$, diode $D_6$, and capacitor $C_5$.

Here, a boost power stage is configured by the first and third paths to receive half-sinusoid DC input voltage $V_{in}$, and to generate substantially constant voltage $V_{bus}$ across capacitor $C_6$ with larger capacitance. Also, a buck power stage may be configured by the second and fourth paths to receive voltage $V_{bus}$ across capacitor $C_6$, and to generate a substantially constant output current $I_o$ to drive the load (e.g., LED lamps). As for the AC/DC power converter of FIG. 3A, the first path of the boost power stage and the second path of the buck power stage can share power switch $Q_2$. Further, the third path of the boost power stage and the fourth path of the buck power stage can share output diode $D_6$.

A protection circuit can also be included in the AC/DC power converter of FIG. 3A to prevent the current of the second path from being transferred to the input terminal. The protection circuit can include diode $D_5$ coupled between inductor $L_2$ and power switch $Q_2$ of the first path. Diode $D_7$ coupled between diode $D_5$ and inductor $L_3$ of the second path can also be included to prevent the inductor current of inductor $L_3$ from being negative.

A current sensing circuit can be configured in the second path to detect the current of the second path (e.g., the inductor current of inductor $L_3$), to derive output current information. Specifically, sampling resistor $R_{sen}$ can be included in the current sensing circuit. The output current can be derived from the voltage across sampling resistor $R_{sen}$ representative of a peak inductor current. A controlling and driving signal can be generated in accordance with the output current by controlling and driving circuit 303 to control operation of power switch $Q_2$, to achieve power factor correction and a substantially constant output current.

The circuit implementation and various example conductive paths in different (e.g., first and second) operation modes of the AC/DC power converter of FIG. 3A have been described above. Example operation of power factor correction and a substantially constant output electrical signal of the AC/DC power converter of FIG. 3A will also be described herein.

Based on operating principles of buck power stages, when the inductor current is operated in a boundary conduction mode (BCM), the output current can be calculated as per formula (1) below.

$$I_0 = \frac{V_{bus} - V_0}{2L_{m3}} \times D \times T_s = \frac{V_{bus} - V_0}{2L_{m3}} \times t_{on} \quad (1)$$

Here, $I_o$ is representative of the output current of the buck power stage, $L_{m3}$ is representative of the inductance of inductor $L_3$, D is representative of the duty cycle of the buck power stage, $V_{bus}$ is representative of the voltage across capacitor $C_6$, which is input to the buck power stage as the input voltage, $V_o$ is representative of the output voltage of the buck power stage, $t_{on}$ is representative of the on time of power switch $Q_2$, and $T_s$ is representative of the switching cycle of power switch $Q_2$.

If the on time $t_{on}$ of power switch $Q_2$ can be controlled to be substantially constant, output current $I_o$ can be substantially constant due to the substantially constant value of inductance $L_{m3}$ of inductor $L_3$, input voltage $V_{bus}$, and output voltage $V_o$. The peak input current $I_{inpk}$ can be calculated as per the following formula (2) in accordance boost power stage operating principles.

$$I_{inpk} = \frac{V_{in}}{L_{m2}} \times t_{on} \quad (2)$$

Here, $I_{inpk}$ is representative of the peak input current, $V_{in}$ is representative of the half-sinusoid dc input voltage, $L_{m2}$ is representative of the inductance of inductor $L_2$, and $t_{on}$ is representative of the on time of power switch $Q_2$. Since the inductance $L_{m2}$ of inductor $L_2$ and on time $t_{on}$ are substantially constant, peak input current $I_{inpk}$ may be directly proportional to half-sinusoid dc input voltage $V_{in}$ to achieve a higher power factor.

One skilled in the art will recognize that the on time of power switch $Q_2$ can be controlled to be substantially constant by employing available constant on-time controlling and driving circuits in accordance with output current feedback information $I_{FB}$. In this example, when power switch $Q_2$ is turned on, the first and second paths can share power switch $Q_2$. Also, when power switch $Q_2$ is turned off, the third and fourth paths can share diode $D_6$. A boost power stage can include the first and third paths configured to achieve the power factor correction. Also, a buck power stage can include the second and fourth paths to achieve a substantially constant output electrical signal, and the second and fourth paths can share controlling and driving circuit 303. In this way, an improved power factor and steadier output current with fewer ripple waves can be applicable in relatively power applications (e.g., an LED driver).

Figure 4A:
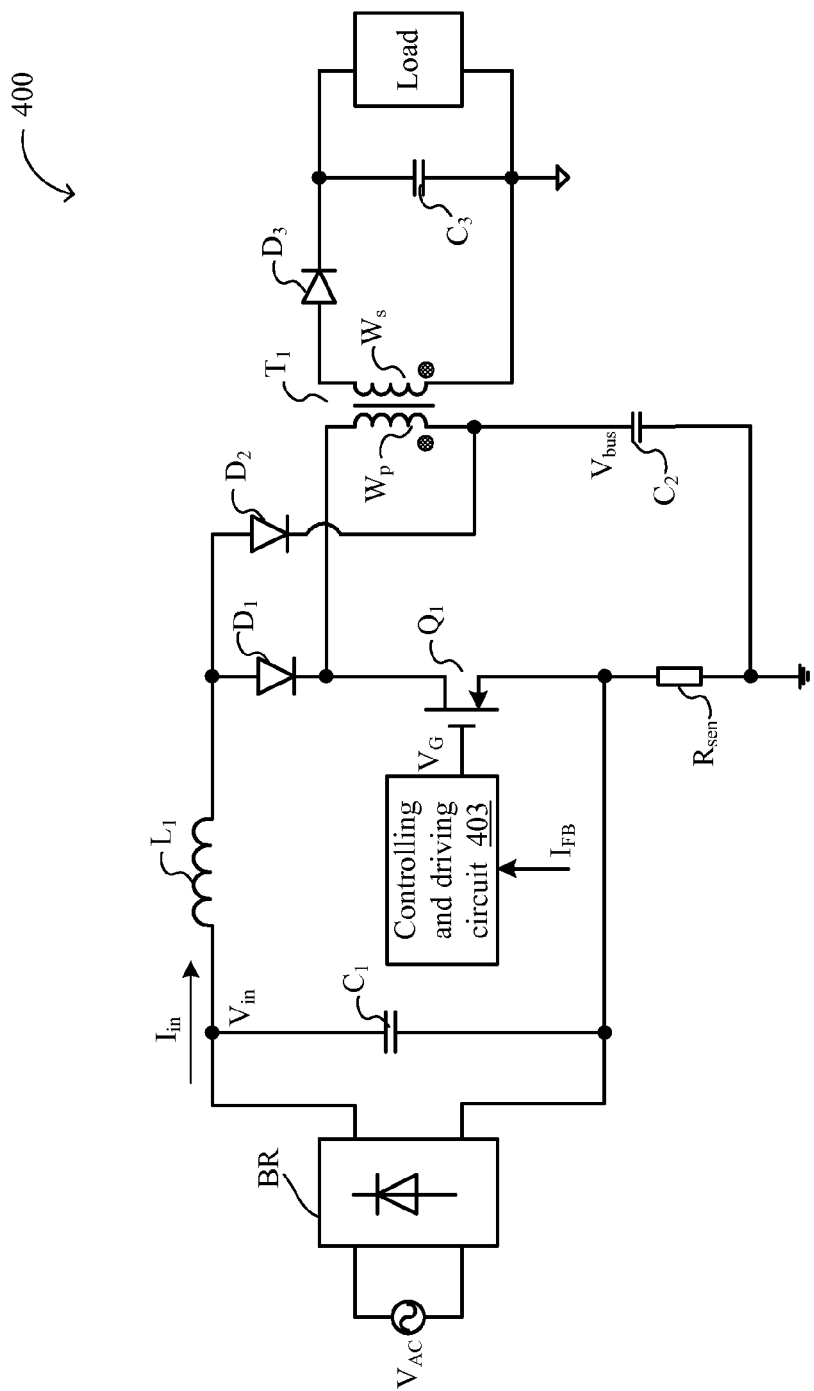
FIG. 4A shows a schematic diagram of a second example AC/DC power converter in accordance with embodiments of the present invention.

Referring now to FIG. 4A, shown is a schematic diagram of a second example AC/DC power converter in accordance with embodiments of the present invention. AC/DC power converter 400 can include inductor $L_1$ as the first energy storage component, transformer $T_1$ including primary winding $W_p$ and secondary winding $W_s$ as the second energy storage component, and capacitor $C_2$ as the third energy storage component. Also, a first path (denoted by an encircled 1), a second path (denoted by an encircled 2), a third path (denoted by an encircled 3), and a fourth path (denoted by an encircled 4) are also included, and we will be discussed with reference to FIGS. 4B and 4C.

Figure 4B:
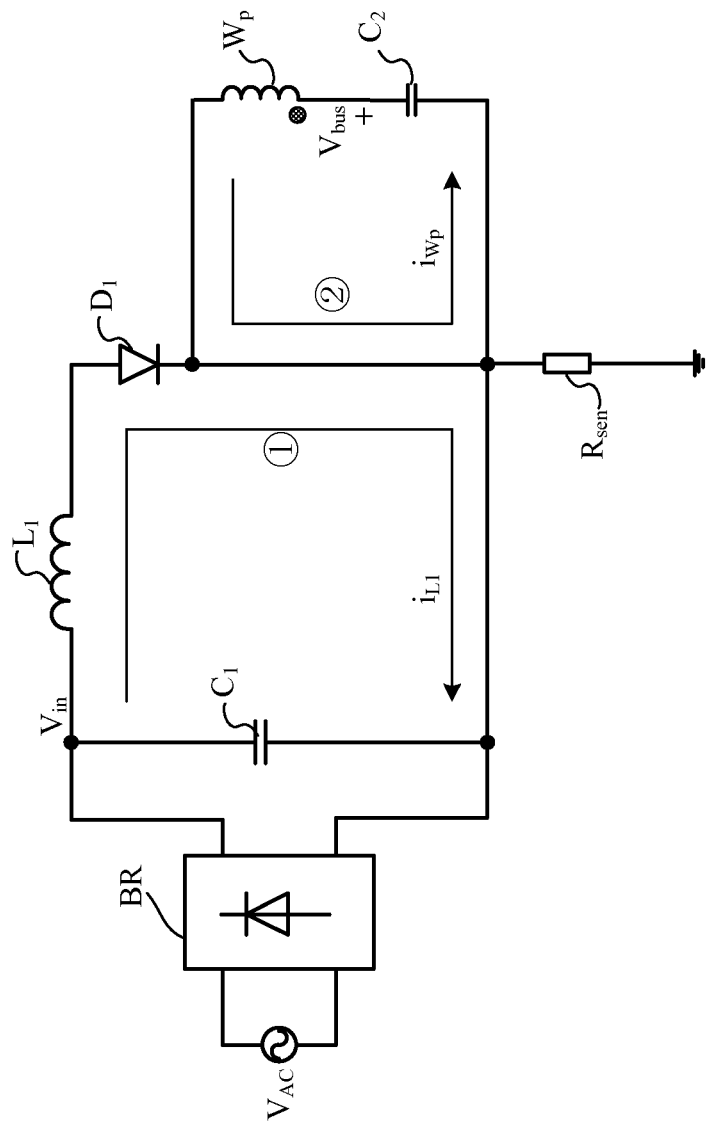
FIG. 4B shows an example conductive path of the AC/DC power converter of FIG. 4A during a first operation mode.

Referring now to FIG. 4B, shown is an example conductive path in a first operation mode of the AC/DC power converter of FIG. 4A. In the first operation mode, power switch $Q_1$ is turned on. Inductor current $i_{L1}$ of inductor $L_1$ can continue to increase to store energy in the first path, which can include inductor $L_1$, power switch $Q_1$, and capacitor $C_1$. Simultaneously, inductor current $i_{wp}$ of primary winding $W_p$ can continue to increase to store energy in transformer $T_1$ in the second path, which can include primary winding $W_p$, power switch $Q_1$, and capacitor $C_2$.

Figure 4C:
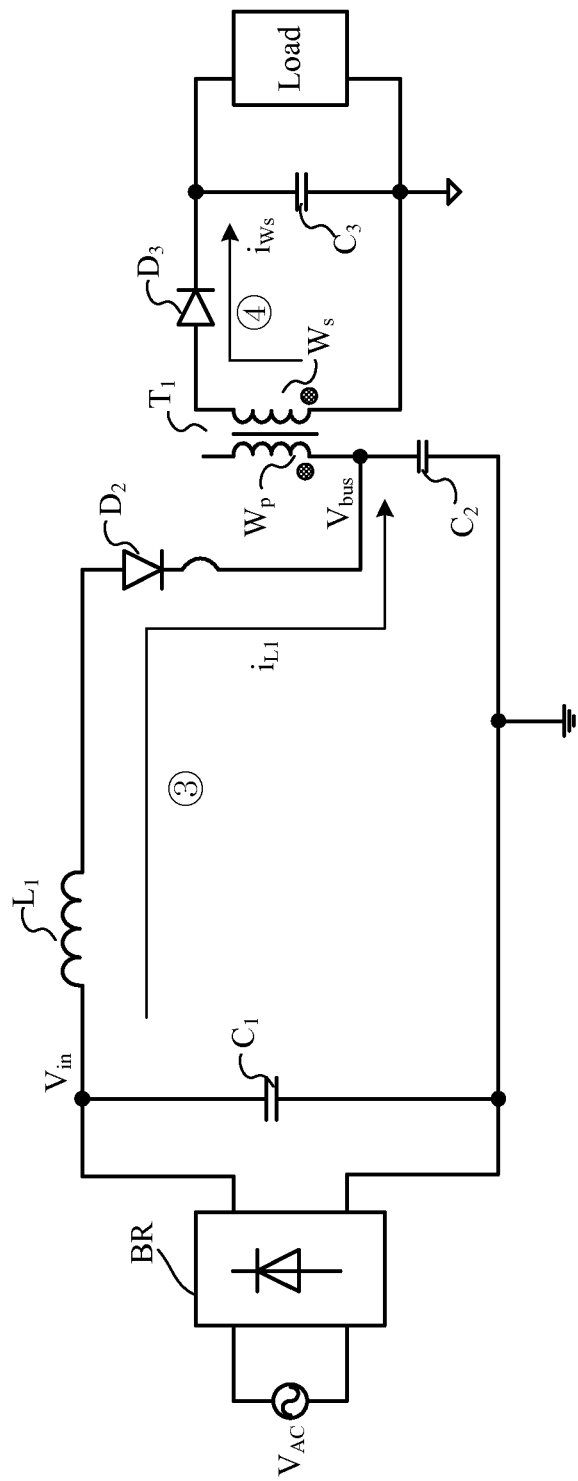
FIG. 4C shows an example conductive path of the AC/DC power converter of FIG. 4A during a second operation mode.

Referring now to FIG. 4C, shown is an example conductive path in a second operation mode of the AC/DC power converter of FIG. 4A. In the second operation mode, power switch $Q_1$ is turned off. In the third path, which can include inductor $L_1$, diode $D_2$, and capacitor $C_2$, inductor current $i_{L1}$ can continue to decrease to release energy to capacitor $C_2$ by charging. When the capacitance of capacitor $C_2$ is sufficiently high, voltage $V_{bus}$ across capacitor $C_2$ can be maintained as substantially constant with minimal fluctuation. Simultaneously, inductor current $i_{ws}$ of second winding $W_s$ can continue to decrease to release the energy of transformer $T_1$ to the load through the fourth path, which can include secondary winding $W_s$, diode $D_3$, and capacitor $C_3$.

Here, the first and third paths can form a boost power stage to receive half-sinusoid DC input voltage $V_{in}$, and to generate a substantially constant voltage $V_{bus}$ across capacitor $C_2$. The second and fourth paths can form a flyback power stage to receive voltage $V_{bus}$, and to generate a substantially constant output current $I_o$ to drive the load (e.g., LED lamps). The boost power stage and the flyback power stage can share power switch $Q_1$ and controlling and driving circuit 403.

A protection circuit can also be included in the AC/DC power converter of FIG. 4A to keep the current of the second path from reflowing to the input terminal, and to keep the primary winding of the transformer from short-circuiting. For example, diode $D_1$ coupled between inductor $L_1$ and power switch $Q_1$ of the first path can be included in the protection circuit. The circuit structure and the conductive paths of different operation modes of the AC/DC power converter of FIG. 4A have been described herein. Also, controlling principles of power factor correction and constant output electric signal of the AC/DC power converter of FIG. 4A will be described below.

The output current $I_o$ of the AC/DC power converter can be calculated as per formula (3) in accordance with operation principles of the flyback power stage.

$$I_0 = I_{pk} \times \frac{n}{2} \times \frac{t_{off}}{t_s} \quad (3)$$

Here, $I_o$ is representative of output current of flyback power stage, $I_{pk}$ is representative of peak current of primary winding of transformer $T_1$, n is representative of the turn ratio of secondary winding $W_s$ and primary winding $W_p$ of transformer $T_1$, $t_{off}$ is representative of the off time of power switch $Q_1$, and $t_s$ is representative of the switching period of power switch $Q_1$. For example, off time $t_{off}$ of power switch $Q_1$ can be calculated as below in formula (4).

$$t_{off} = t_{on} \times \frac{V_{bus}}{n \times V_0} \quad (4)$$

Here, $t_{on}$ is representative of on time of power switch $Q_1$, $V_o$ is representative of output voltage of the AC/DC power converter, $V_{bus}$ is representative of the voltage across capacitor $C_2$ that can be configured as the input voltage of the flyback power stage. Peak current $I_{pk}$ of primary winding $W_p$ of formula (3) can be calculated as in formula (5) below.

$$I_{pk} = \frac{V_{bus}}{L_p} \times t_{on} \quad (5)$$

Here, $L_p$ is representative of the inductance of primary winding $W_p$ of transformer $T_1$. Formulas (4) and formula (5) may be substituted into formula (3), to derive formula (6) below.

$$I_0 = \frac{V_{bus}}{L_p} \times t_{on} \times \frac{n}{2} \times \frac{V_{bus}}{n \times V_0 + V_{bus}} \quad (6)$$

Since voltage $V_{bus}$ and output voltage $V_o$ can be maintained as substantially constant, and inductance $L_p$ of inductor $L_1$ and turn ratio n are constant values, if on time $t_{on}$ of power switch $Q_1$ can be controlled to be substantially constant, a substantially constant output current $I_o$ can be achieved. Input current $I_{in}$ of the AC/DC power converter can be calculated as formula (7), in accordance with the operation principles of boost power stages.

$$I_{inpk} = \frac{V_{in}}{L_{m1}} \times t_{on} \quad (7)$$

Here, $I_{inpk}$ is representative of peak input current, $V_{in}$ is representative of half-sinusoid DC input voltage $V_{in}$, and $L_{m1}$ is representative of inductance of inductor $L_1$. Since inductance $L_{m1}$ of inductor $L_1$ is constant, if on time $t_{on}$ is substantially constant, peak input current $I_{inpk}$ may be in direct proportion with half-sinusoid DC input voltage $V_{in}$ to achieve a higher power factor. Thus for the AC/DC power converter of FIG. 4A, both constant output current and power factor correction can be achieved if the on time of power switch $Q_1$ can be controlled to be substantially constant.

Figure 4D:
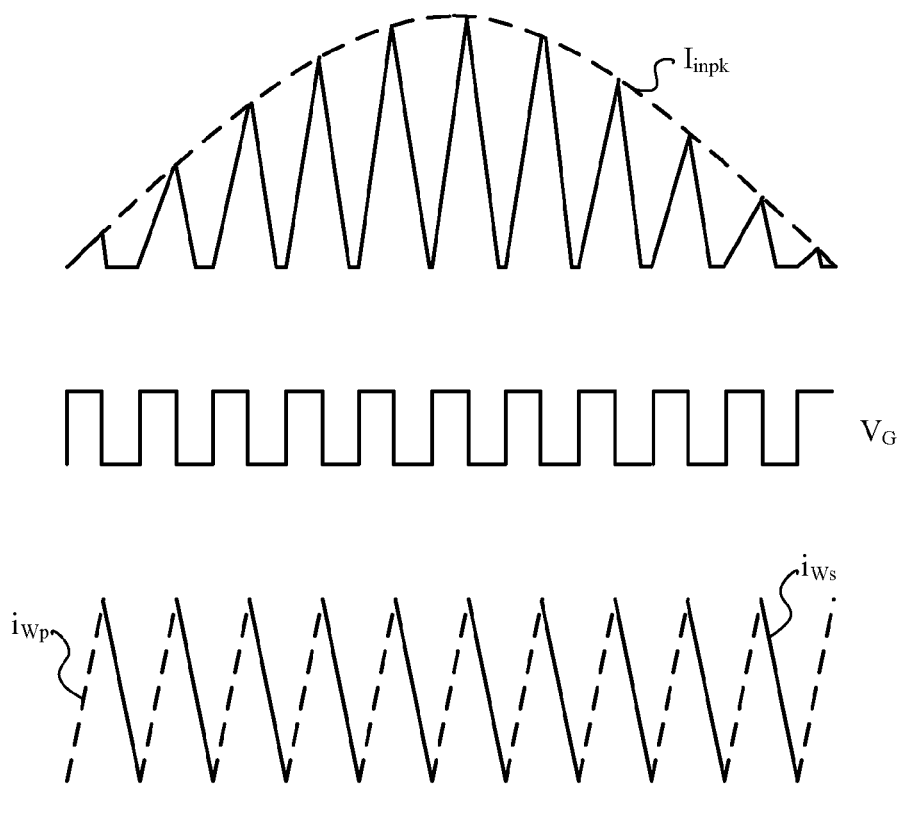
FIG. 4D shows example operation waveforms of the AC/DC power converter of FIG. 4A.

Referring now to FIG. 4D, example operation waveforms of the AC/DC power converter of FIG. 4A are shown. In the example that inductor current is operating in boundary conduction mode (BCM), the peak envelope of input current $I_{in}$ may be indicated as a half-sinusoid waveform to achieve a much higher power factor. The current waveforms of current through primary winding $W_p$ and secondary winding of transformer $T_1$ are indicated as waveform $i_{wp}$ and waveform $i_{ws}$, respectively. Peak current of primary winding $W_p$ can be maintained as constant, and on time of power switch $Q_1$ can be maintained as constant that is the rising time of current through primary winding $W_p$.

Controlling and driving circuit 403 may be configured to generate driving signal $V_G$ in accordance with output current information $I_{FB}$ of AC/DC power converter to control operation of power switch $Q_1$ to maintain on time that is substantially constant. In this way, a higher power factor and substantially constant output current can be achieved.

The output current information can be obtained through various ways, such as an auxiliary winding coupled to primary winding, or sampling output current directly and being transferred to controlling and driving circuit 403 at the primary side of the transformer by an optical coupler, or employing any primary side controlling mode. Controlling and driving circuit 403 can be configured to control operation of power switch $Q_1$ based on the output current information, which can utilize any suitable circuit structures.

Furthermore, a current sampling circuit can also be included in the second path. Inductor current flowing through primary winding $W_p$, independent of inductor current of the first path, can be sampled by the current sampling circuit because the current sampling circuit is configured in the second path that can store energy in transformer $T_1$ through primary winding $W_p$. Controlling and driving circuit 403 can control the on time of power switch $Q_1$ to be substantially constant to achieve power factor correction and a substantially constant output electrical signal in accordance with the sampled current information of the current sampling circuit.

For example, the current sampling circuit can include sampling resistor $R_{sen}$ coupled between power switch $Q_1$ and ground. Also, one terminal of capacitor $C_2$ can be coupled to primary winding $W_p$, while the other terminal may be coupled to ground. The voltage across sampling resistor $R_{sen}$ can be representative of the inductor current of primary winding $W_p$ when power switch $Q_1$ is on, and output current information $I_{FB}$ can be derived therefrom.

Figure 5A:
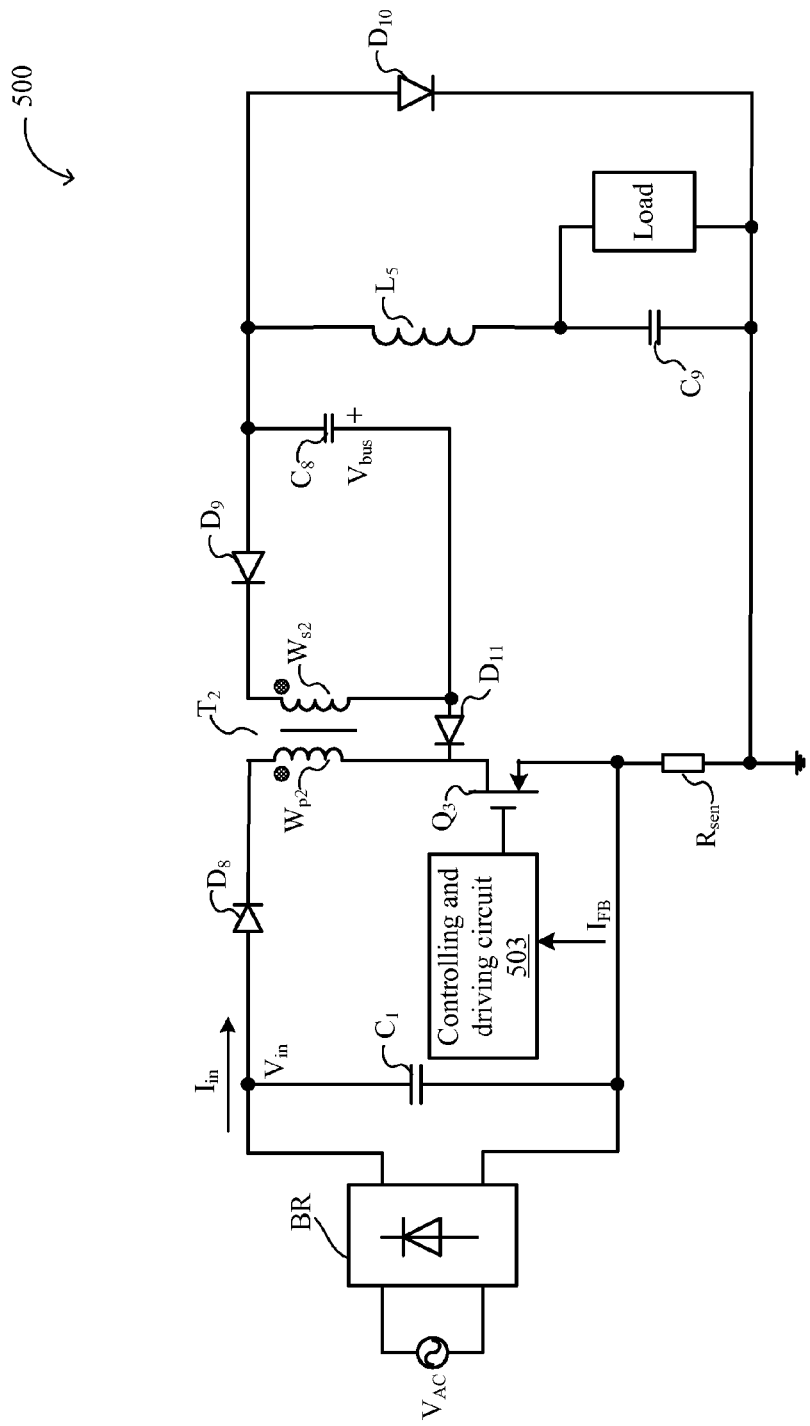
FIG. 5A shows a schematic diagram of a third example AC/DC power converter in accordance with embodiments of the present invention.

Referring now to FIG. 5A, shown is a schematic diagram of a third example AC/DC power converter in accordance with embodiments of the present invention. Here, AC/DC power converter 500 can include inductor $W_{p2}$ as the first energy storage component, inductor $L_5$ as the second energy storage component, and capacitor $C_8$ as the third energy storage component.

Figure 5B:
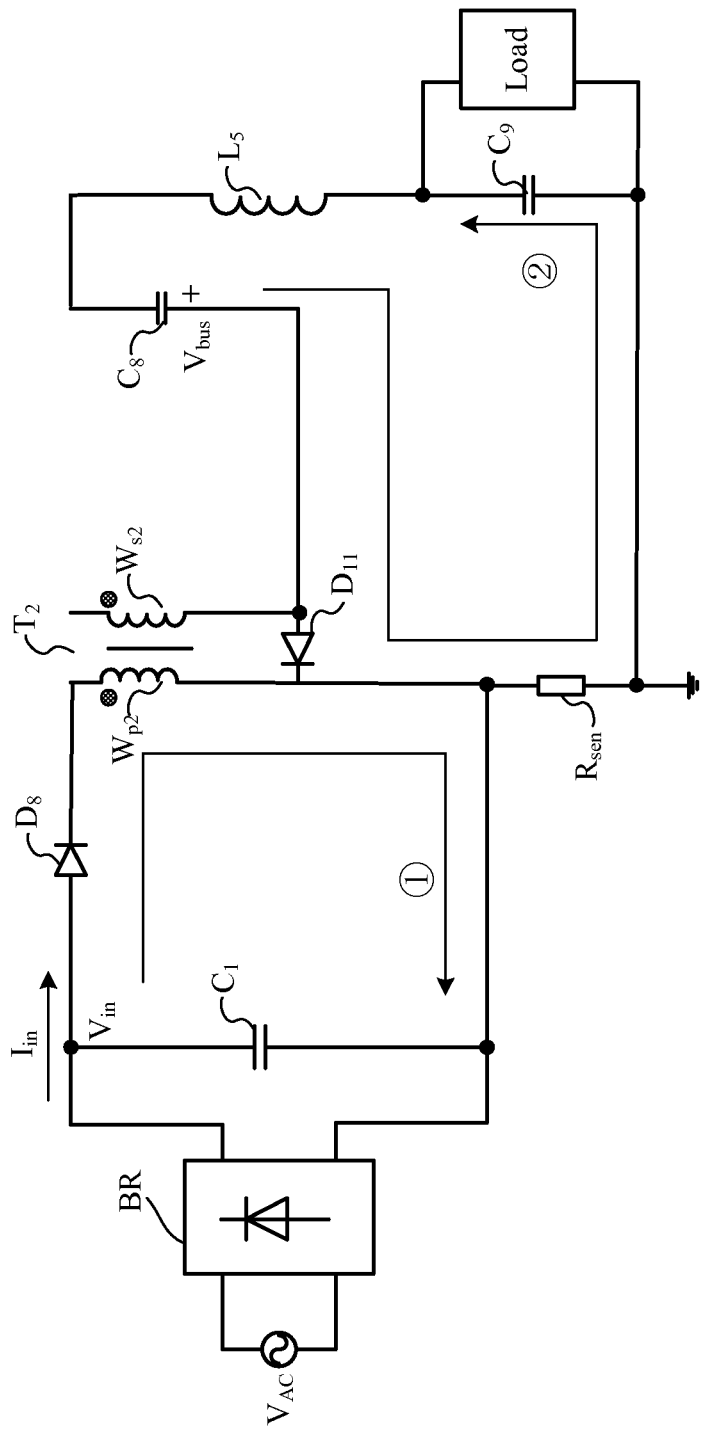
FIG. 5B shows an example conductive path of the AC/DC power converter of FIG. 5A during a first operation mode.

Referring now to FIG. 5B, shown is an example conductive path of the AC/DC power converter of FIG. 5A in a first operation mode. In the first operation mode, power switch $Q_3$ can be turned on, and the inductor current of inductor $W_{p2}$ can continue to increase to store energy in inductor $W_{p2}$ through a first path (denoted by an encircled 1), which can include inductor $W_{p2}$, power switch $Q_3$, and capacitor $C_1$. Simultaneously, the inductor current flowing through inductor $L_5$ can continue to increase to store energy in inductor $L_5$ through a second path (denoted by an encircled 2), which can include inductor $L_5$, power switch $Q_3$, and capacitor $C_8$.

Figure 5C:
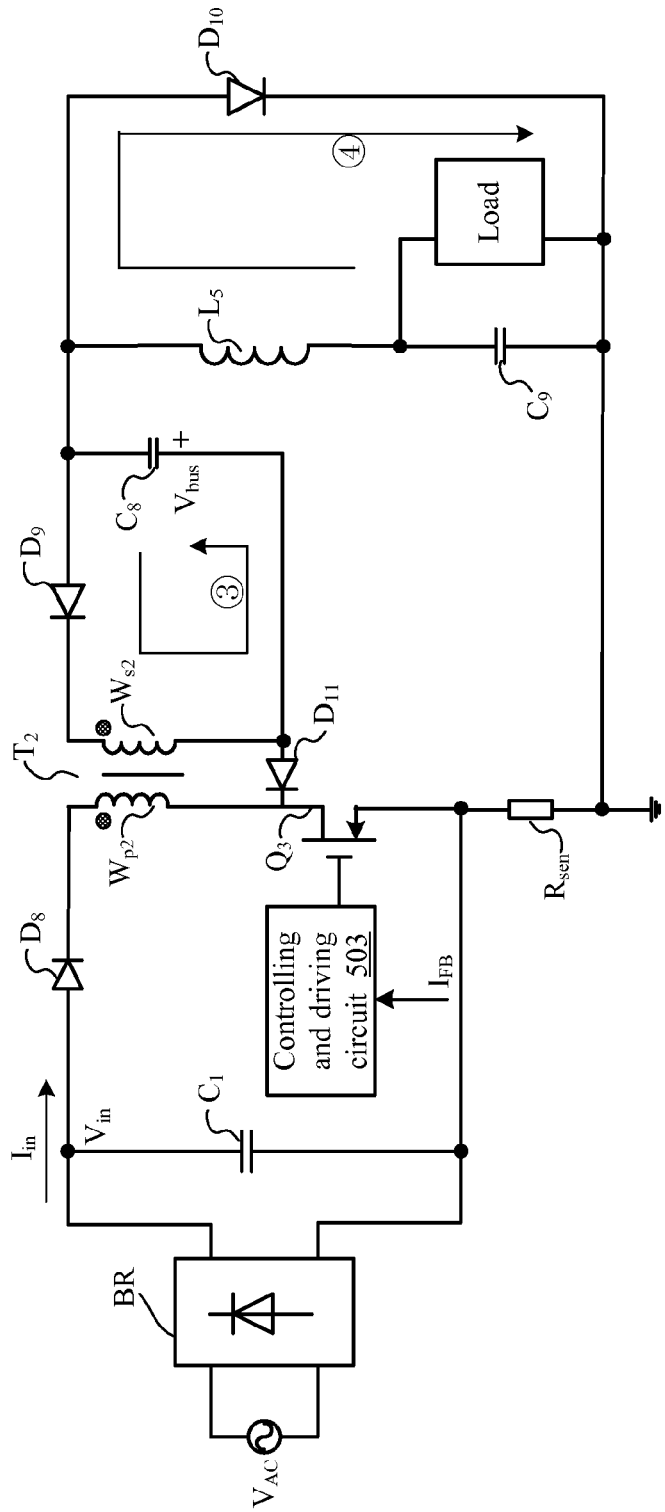
FIG. 5C shows an example conductive path of the AC/DC power converter of FIG. 5A during a second operation mode.

Referring now to FIG. 5C, shown is an example conductive path of the AC/DC power converter of FIG. 5A in a second operation mode. In the second operation mode, power switch $Q_3$ is turned off, and the inductor current of inductor $W_{s2}$ can continue to decrease to release energy to capacitor $C_8$ by charging through third path (denoted by an encircled 3), which can include inductor $W_{s2}$, diode $D_8$, and capacitor $C_8$. When the capacitance of capacitor $C_8$ is sufficiently large, voltage $V_{bus}$ across capacitor $C_8$ can be maintained as substantially constant with minimal fluctuation. Simultaneously, the inductor current of inductor $L_5$ can continue to decrease, and the energy of inductor $L_5$ may release to the load through a fourth path (denoted by an encircled 4), which can include inductor $L_5$, diode $D_{10}$, and capacitor $C_9$.

Here, the first and third paths may form an isolated flyback power stage to receive half-sinusoid DC input voltage $V_{in}$, and to generate a constant voltage $V_{bus}$ across capacitor $C_8$ with a sufficiently large capacitance. The second and fourth paths can form a buck power stage to receive voltage $V_{bus}$ across capacitor $C_8$, and to generate a substantially constant output voltage $V_o$ and a substantially constant output current $I_o$ to drive the load (e.g., LED lamps). The first and second paths of the AC/DC power converter of FIG. 5A can share power switch $Q_3$ and controlling and driving circuit 503.

A protection circuit can also be included in the AC/DC power converter of FIG. 5A. For example, the protection circuit can include diode $D_{11}$ coupled between primary winding $W_{p2}$ and secondary winding $W_{s2}$, and diode $D_8$ coupled between capacitor $C_1$ and primary winding $W_{p2}$. Diode $D_8$ can be configured to keep the current from reflowing to the input terminal when the input voltage is lower. Further, diode $D_{11}$ can be configured to keep the input voltage from grounding.

Figure 6A:
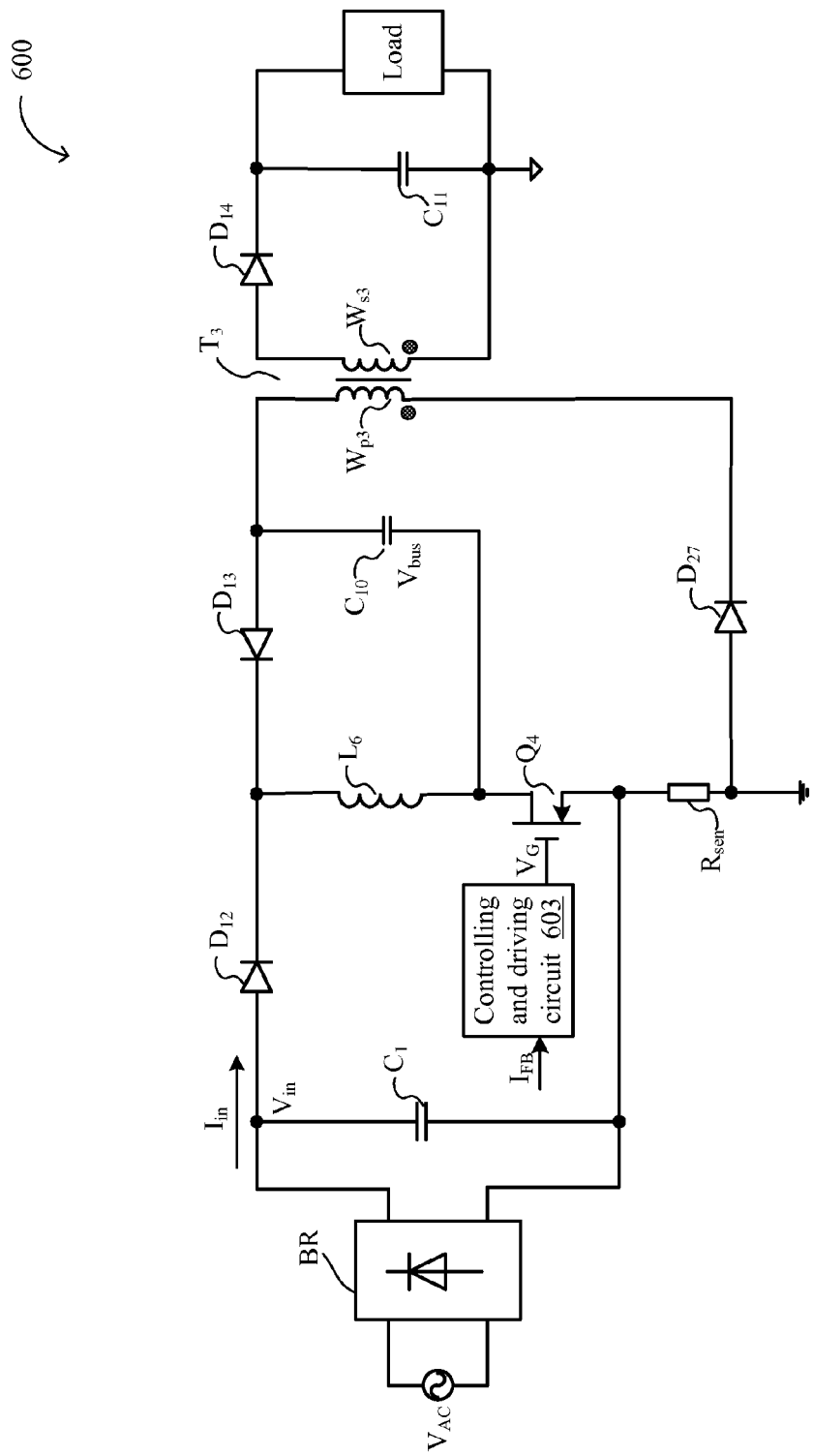
FIG. 6A shows a schematic diagram of a fourth example AC/DC power converter in accordance with embodiments of the present invention.

Referring now to FIG. 6A, shown is a schematic diagram of a fourth example AC/DC power converter in accordance with embodiments of the present invention. AC/DC power converter 600 can include inductor $L_6$ as the first energy storage component, transformer $T_3$ can include primary winding $W_{p3}$ and secondary winding $W_{s3}$ as the second energy storage component, and capacitor $C_{10}$ as the third storage component.

Figure 6B:
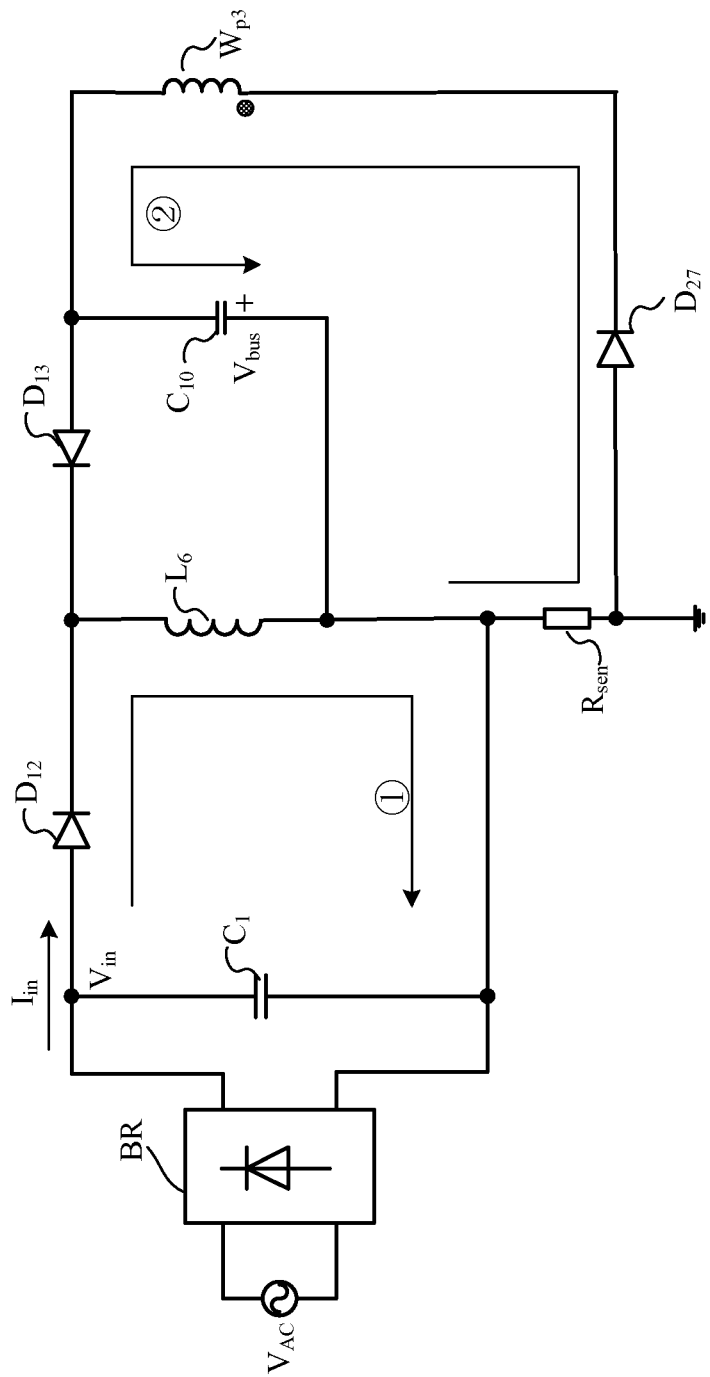
FIG. 6B shows an example conductive path of the AC/DC power converter of FIG. 6A during a first operation mode.

Referring now to FIG. 6B, shown as an example conduction path of the AC/DC power converter of FIG. 6A in a first operation mode. In the first operation mode, power switch $Q_4$ is turned on, and the inductor current of inductor $L_6$ can continue to increase to store energy in inductor $L_6$ through a first path (denoted by an encircled 1), which can include diode $D_{12}$, inductor $L_6$, power switch $Q_4$, and capacitor $C_1$. Simultaneously, the inductor current of inductor $W_{p3}$ can continue to increase to store energy in primary winding $W_{p3}$ through a second path (denoted by an encircled 2), which can include primary winding $W_{p3}$, power switch $Q_4$, diode $D_{27}$, and capacitor $Q_{10}$.

Figure 6C:
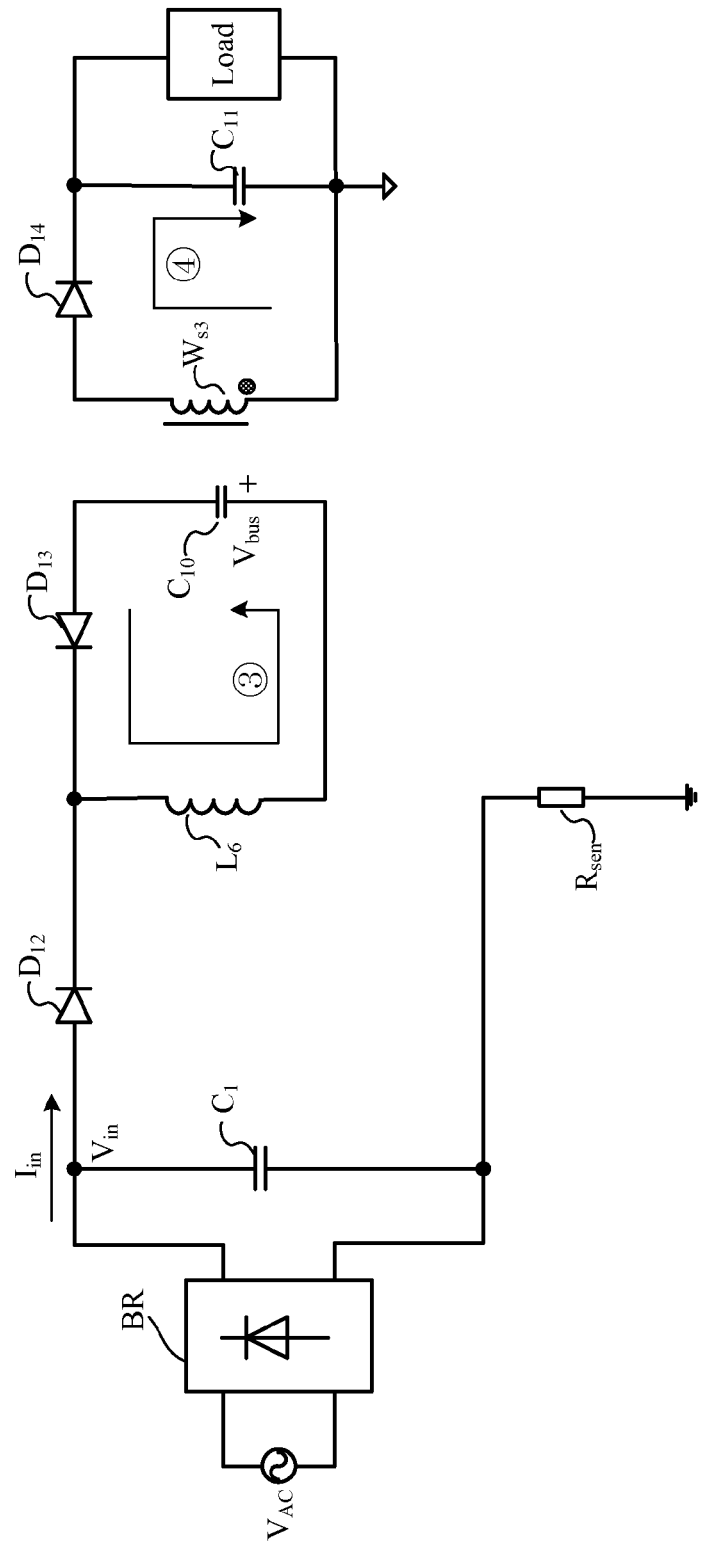
FIG. 6C shows an example conductive path of the AC/DC power converter of FIG. 6A during a second operation mode.

Referring now to FIG. 6C, shown is an example conduction path of the AC/DC power converter of FIG. 6A in a second operation mode. In the second operation mode, inductor current of inductor $L_6$ can continue to decrease to release energy to capacitor $C_{10}$ through charging in a third path (denoted by an encircled 3), which can include inductor $L_6$, diode $D_{13}$ and capacitor $C_{10}$. When the capacitance of capacitor $C_{10}$ is sufficiently large, voltage $V_{bus}$ across capacitor $C_{10}$ can be maintained as substantially constant with minimal fluctuation. Simultaneously, the inductor current of secondary winding $W_{s3}$ can continue to decrease to release energy to the load through a fourth path (denoted by an encircled 4), which can include inductor $W_{s3}$, diode $D_{14}$, and capacitor $C_{11}$.

Here, the first and third paths can form a boost-buck power stage to receive half-sinusoid DC input voltage and generate constant voltage $V_{bus}$ across capacitor $C_{10}$ with a sufficiently large capacitance. Also, the second and fourth paths can form a flyback power stage to receive voltage $V_{bus}$ across capacitor $C_{10}$, and to generate a substantially constant output voltage $V_o$ and a substantially constant output current $I_o$ to drive the load (e.g., LED lamps) through the fourth path. Also, the first and second paths of the AC/DC power converter of FIG. 6A can share power switch $Q_4$ and controlling and driving circuit 603. Further, diode $D_{27}$ can be configured to keep the inductor current of inductor $L_6$ from flowing to primary winding $W_{p3}$ in the second operation mode.

Figure 7A:
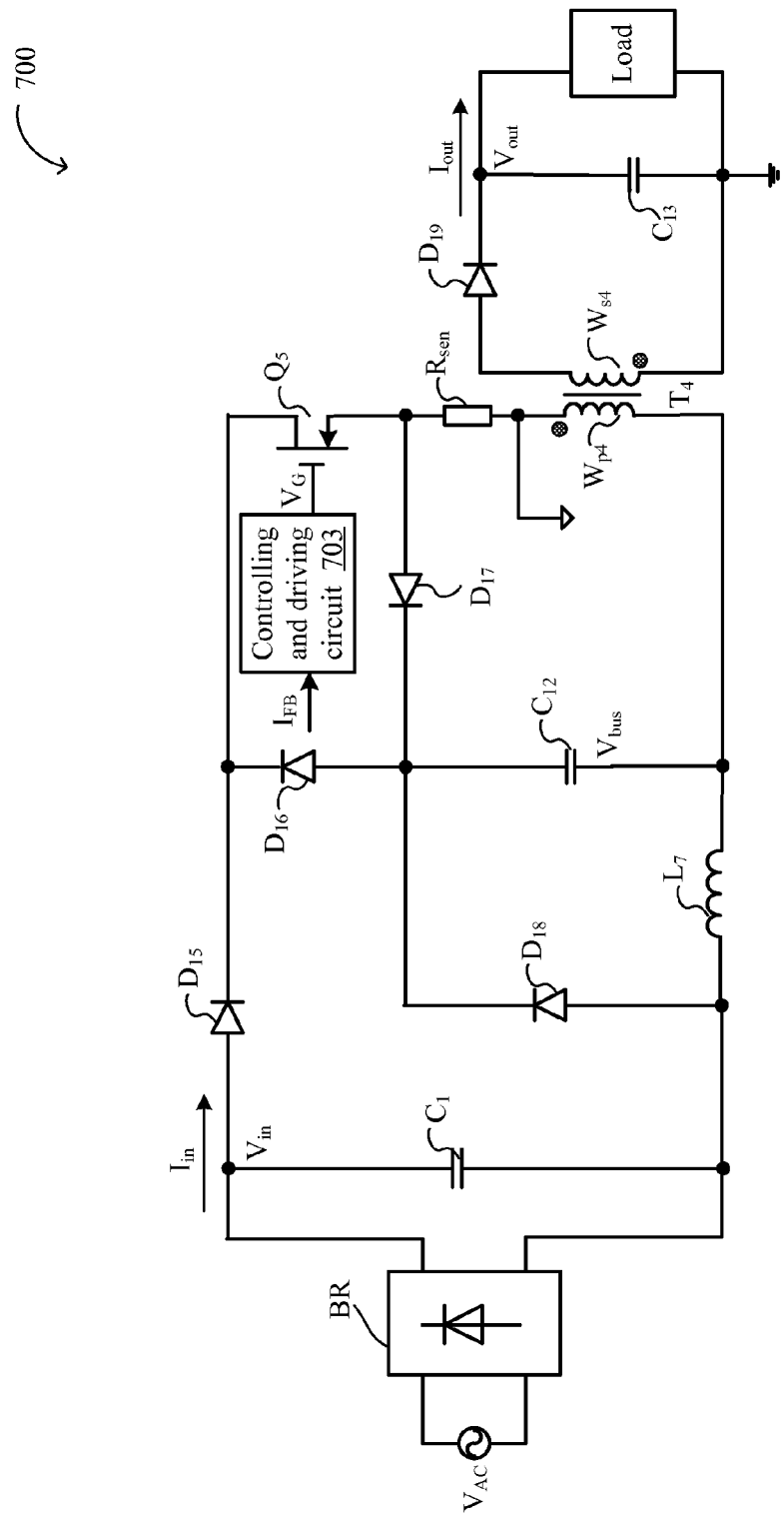
FIG. 7A shows a schematic diagram of a fifth example AC/DC power converter in accordance with embodiments of the present invention.

With reference to FIG. 7A, shown is a schematic diagram of a fifth example AC/DC power converter in accordance with embodiments of the present invention. IAC/DC power converter 700 can include inductor $L_7$ as the first energy storage component, transformer $T_4$ can include primary winding $W_{p4}$ and secondary winding $W_{s4}$ as the second energy storage component, and capacitor $C_{12}$ as the third storage component.

The conduction paths of AC/DC power converter 700 in various operation modes will be described in conjunction with the following figures from FIG. 7B to FIG. 7E. Some components are shared to form the two power stages of AC/DC power converter 700, such as power switch $Q_5$ and controlling and driving circuit 703. One power stage may be configured to achieve the power factor correction to make the peak current envelope (current through inductor $L_7$) as a sinusoid waveform, while the other power stage may be configured to achieve a substantially constant output current to supply to the load (e.g., LED lamps). The voltage across capacitor $C_{12}$ can be configured to provide supply to the other power stage. Also, operation of diodes $D_{16}$ and $D_{17}$ may be determined based on a comparison between the current through inductor $L_7$ and the current through primary winding $W_{p4}$.

Figure 7B:
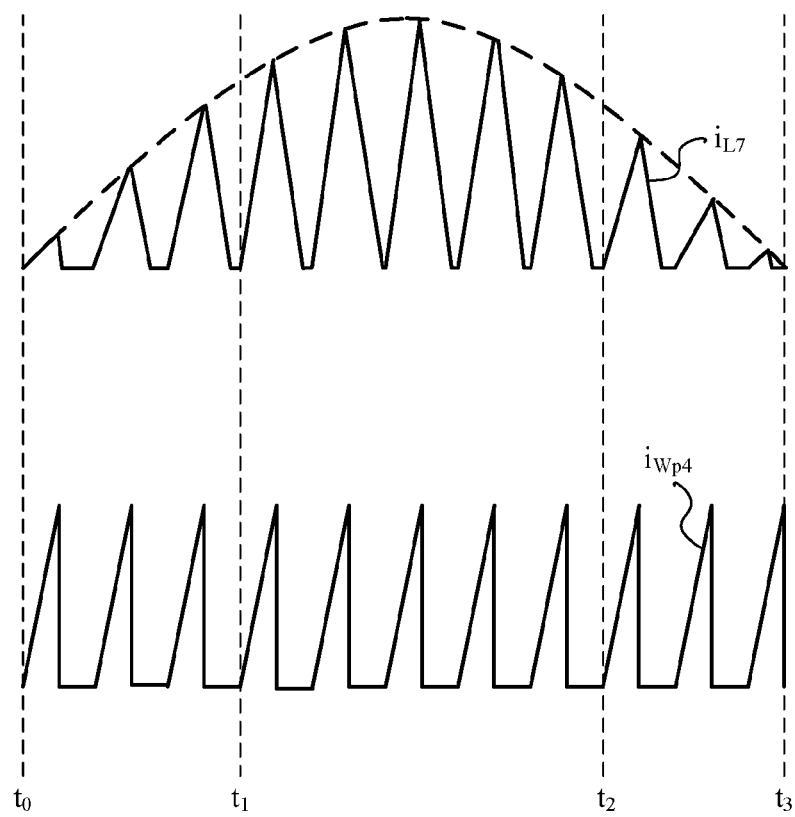
FIG. 7B shows example waveforms of current through an inductor and current through a primary winding.

Referring now to FIG. 7B, shown are example waveforms of the current ($i_{L7}$) through inductor $L_7$ and the current ($i_{Wp4}$) through primary winding $W_{p4}$. AIn view that the on time of power switch $Q_5$ is controlled to be substantially constant in each switch cycle, the peak value of current ($i_{L7}$) may be in direct proportion to half-sinusoid DC input voltage $V_{in}$, and the current ($i_{Wp4}$) can be presented as a triangle waveform with a constant peak value. During the interval from time $t_1$ to time $t_2$, current ($i_{L7}$) is higher than current ($i_{Wp4}$), and diode $D_{17}$ is on. During the interval from time $t_0$ to time $t_1$ and the interval from time $t_2$ to time $t_3$, current ($i_{L7}$) is lower than current ($i_{Wp4}$), and diode $D_{16}$ is on.

Figure 7C:
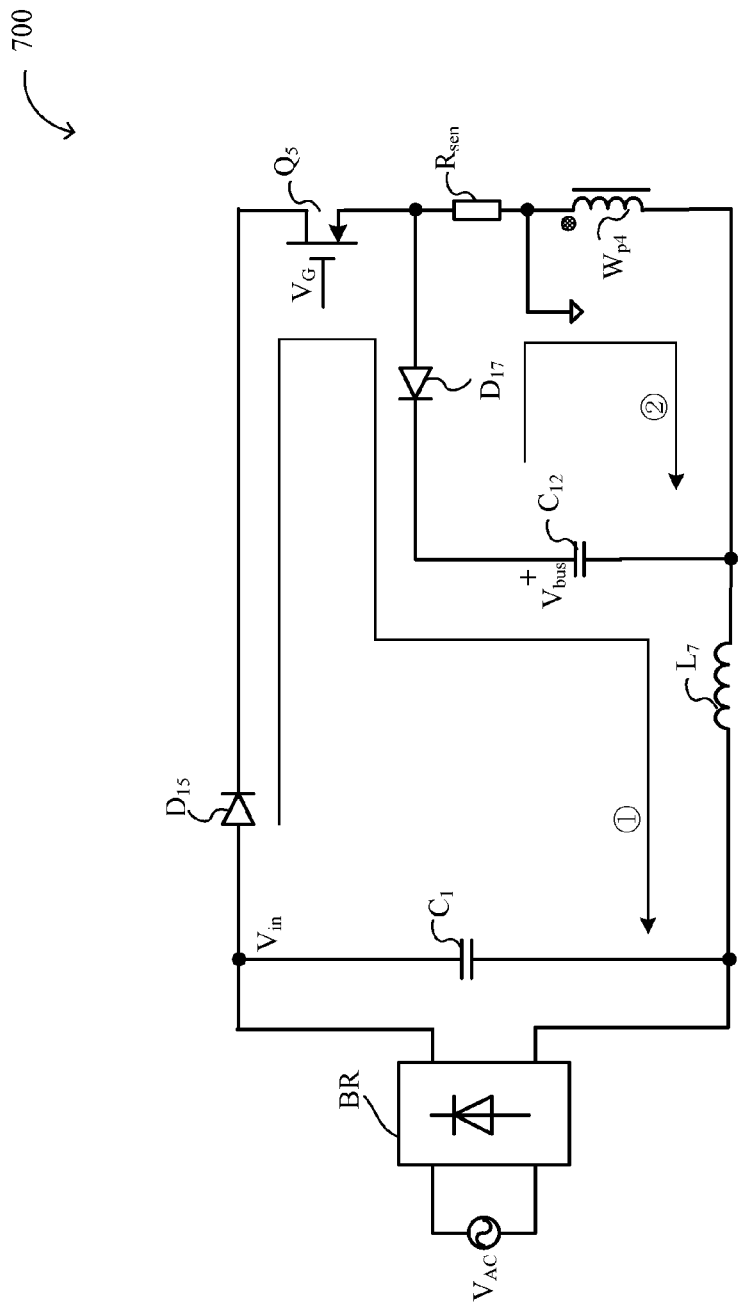

Referring now to FIG. 7C, shown are example conduction paths when both power switch $Q_5$ and diode $D_{17}$ are turned on. Capacitor $C_{12}$ can be charged through power switch $Q_5$, diode $D_{17}$, and the current of inductor $L_7$ can continue to increase in a first path (denoted by an encircled 1). Also, the current of primary winding $W_{p4}$ can continue to increase to store energy through a second path (denoted by an encircled 2), which can include diode $D_{17}$ and capacitor $C_{12}$. Here, resistor $R_{sen}$ can also be included in the second path to sense the current flowing through primary winding $W_{p4}$ accurately since the current of the second path is independent of the current of the first path. The common node of both resistor $R_{sen}$ and primary winding $W_{p4}$ can be coupled to an equal potential of the system, so the voltage of the other terminal of resistor $R_{sen}$ can be representative of the current flowing through primary winding $W_{p4}$.

Figure 7D:
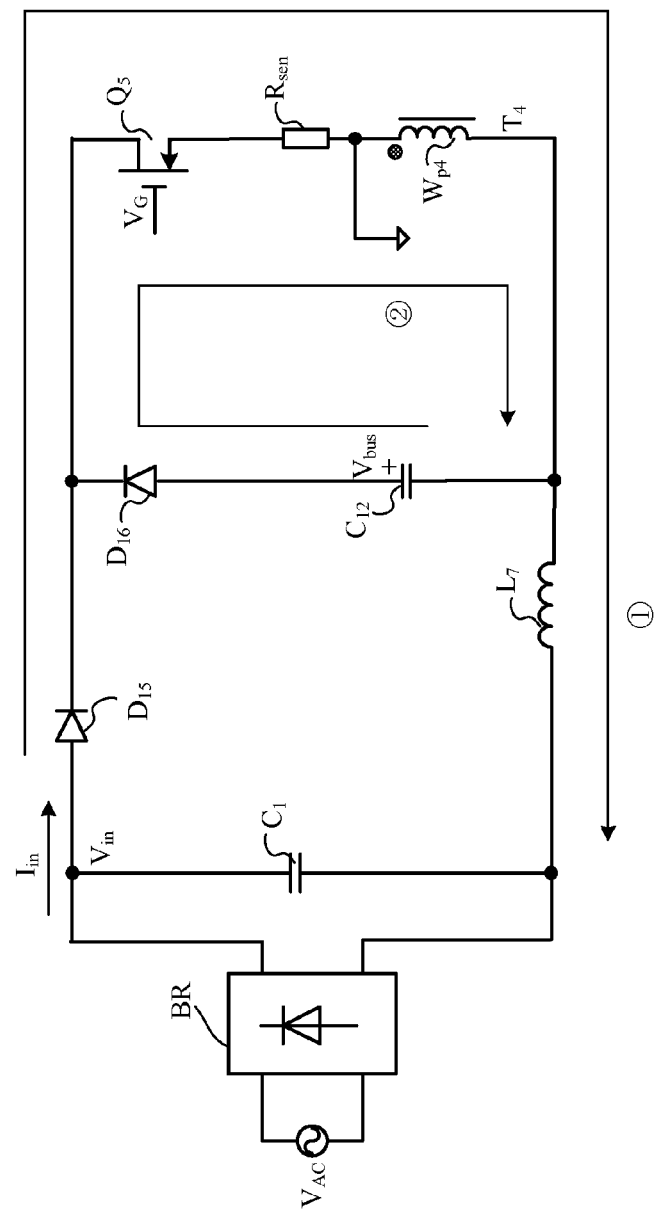

With reference to FIG. 7D, shown are example conduction paths when power switch $Q_5$ is turned on and diode $D_{16}$ is on. The current of inductor $L_7$ can continue to increase through the first path, which can include diode $D_{15}$, power switch $Q_5$, resistor $R_{sen}$, primary winding $W_{p4}$, and inductor $L_7$. The current of primary winding $W_4$ can include both the current of the first path and the current of the second path, which can include diode $D_{16}$, power switch $Q_5$, resistor $R_{sen}$, primary winding $W_{p4}$, and capacitor $C_{12}$. Also, capacitor $C_{12}$ can discharge through the second path.

Figure 7E:
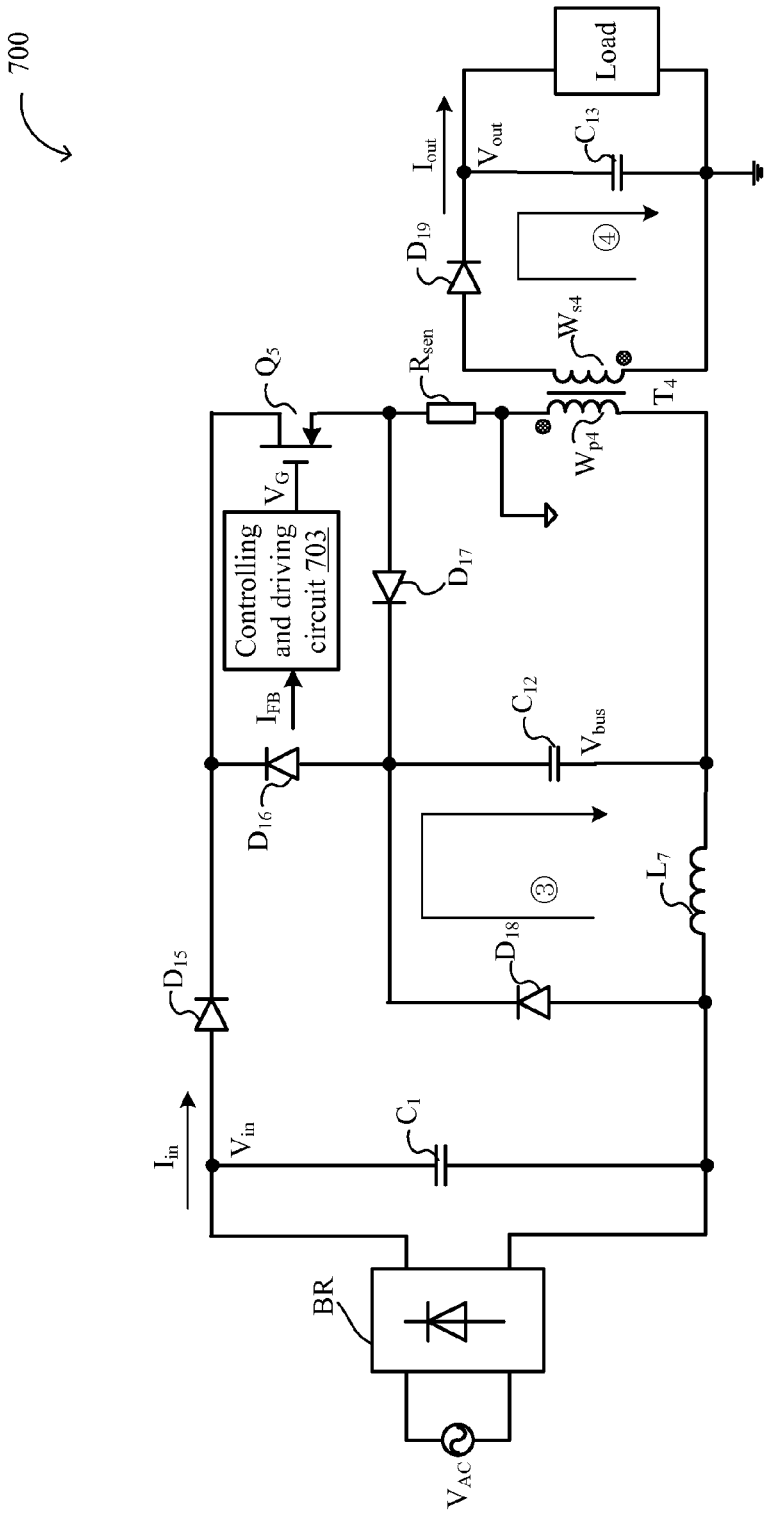
FIG. 7E shows an example conduction path of the AC/DC power converter of FIG. 7A when the power switch is turned off.

Referring now to FIG. 7E, shown is an example conduction path of the AC/DC power converter of FIG. 7A when power switch $Q_5$ is turned off. In this operation mode, the inductor current of inductor $L_7$ can continue to decrease to release energy to capacitor $C_{12}$ through charging in a third path (denoted by an encircled 3), which can include inductor $L_7$, diode $D_{18}$, and capacitor $C_{12}$. When the capacitance of capacitor $C_{12}$ is sufficiently large, voltage $V_{bus}$ across capacitor $C_{12}$ can be maintained as substantially constant with minimal fluctuation. Simultaneously, the inductor current of secondary winding $W_{s4}$ can continue to decrease to release energy to the load through a fourth path (denoted by an encircled 4), which can include inductor $W_{s4}$, diode $D_{19}$, and capacitor $C_{13}$.

Here, the first and third paths can form a buck power stage to receive half-sinusoid DC input voltage and generate constant voltage $V_{bus}$ across capacitor $C_{12}$ with a sufficiently large capacitance. A capacitor with lower capacitance and cost can be configured as capacitor $C_{12}$ due to the lower voltage $V_{bus}$ across capacitor $C_{12}$ generated by the buck power stage. The second and fourth paths can form a flyback power stage to receive voltage $V_{bus}$ across capacitor $C_{12}$, and to generate a substantially constant output voltage $V_o$ and a substantially constant output current $I_o$ to drive the load (e.g., LED lamps) through the fourth path. The first and second paths of the AC/DC power converter of FIG. 7A can share power switch $Q_5$ and controlling and driving circuit 703. Here, diode $D_{15}$ can be configured to keep the current from reflowing to the input terminal when the DC input voltage $V_{in}$ is lower.

Figure 8A:
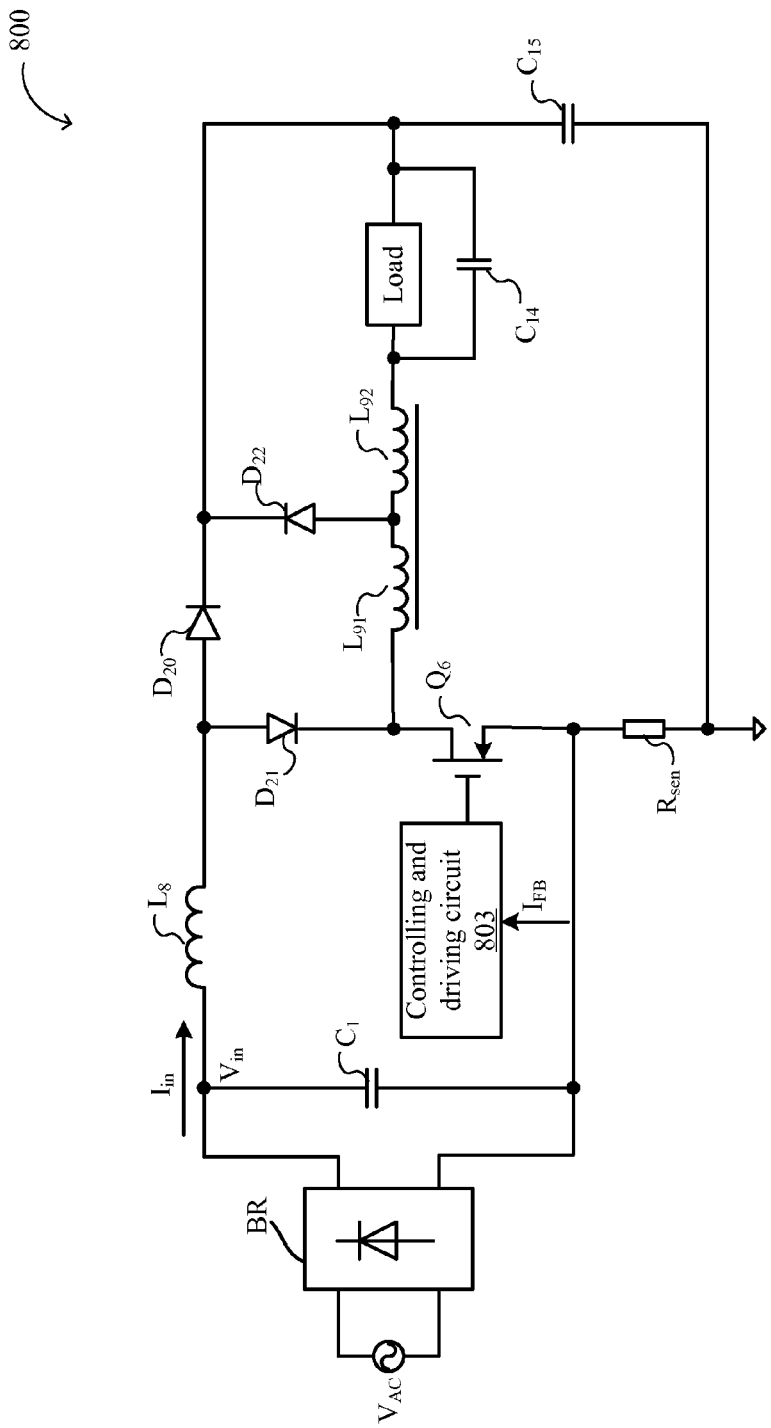
FIG. 8A shows a schematic diagram of a sixth example AC/DC power converter in accordance with embodiments of the present invention.

Referring now to FIG. 8A, shown is a schematic diagram of a sixth example AC/DC power converter in accordance with embodiments of the present invention. AC/DC converter 800 can include inductor $L_8$ as the first energy storage component, inductors $L_{91}$ and $L_{92}$ as the second energy storage component, and capacitor $C_{15}$ as the third energy storage component. Also, a first path (denoted by an encircled 1), a second path (denoted by an encircled 2), a third path (denoted by an encircled 3), and a fourth path (denoted by an encircled 4), will be discussed with reference to FIGS. 8B and 8C.

Here, the first and third paths can form a boost power stage to receive half-sinusoid DC input voltage $V_{in}$, and to generate a constant voltage $V_{bus}$ across capacitor $C_{15}$. The second and fourth paths can form a buck power stage to receive voltage $V_{bus}$, and to generate a substantially constant output current $I_o$ to drive the load (e.g., LED lamps). Also, the boost power stage and the buck power stage can share power switch $Q_6$ and controlling and driving circuit 803.

Figure 8B:
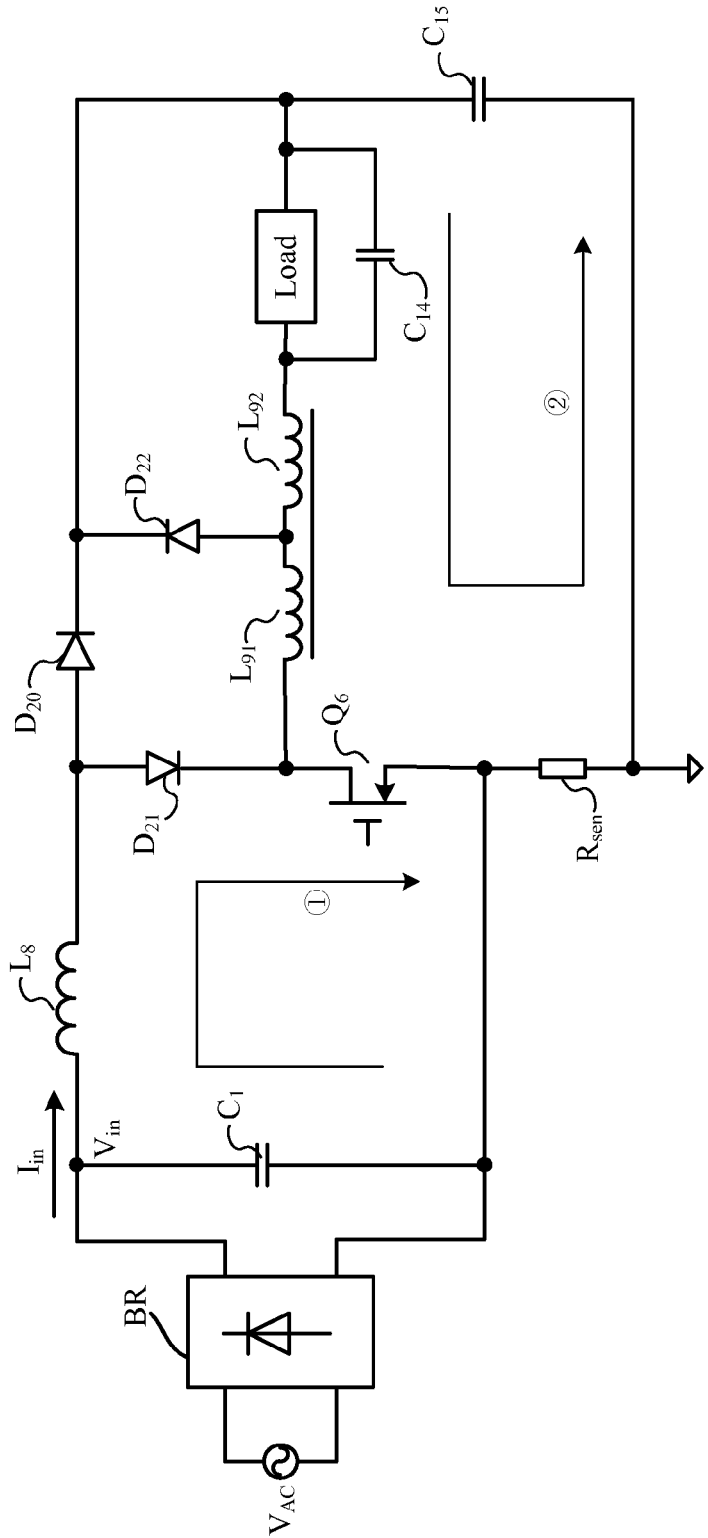
FIG. 8B shows an example conductive path in a first operation mode of the AC/DC power converter of FIG. 8A.

Referring now to FIG. 8B, shown as an example conductive path in a first operation mode of the AC/DC power converter of FIG. 8A. In the first operation mode, power switch $Q_6$ is turned on. Inductor current $i_{L8}$ of inductor $L_8$ can continue to increase to store energy in the first path, which can include inductor $L_8$, diode $D_{21}$, and power switch $Q_6$. Simultaneously, inductor current flowing through coupled inductors $L_{91}$ and $L_{92}$ can continue to increase in the second path, which can include capacitor $C_{15}$, capacitor $C_{14}$, coupled inductors $L_{91}$ and $L_{92}$, and power switch $Q_6$. Also, resistor $R_{sen}$ can be arranged between a common node of power switch $Q_6$ and an output terminal of the rectifier bridge BR, and an equivalent potential can also be included in the second path to accurately sense the inductor current flowing through coupled inductors $L_{91}$ and $L_{92}$.

Figure 8C:
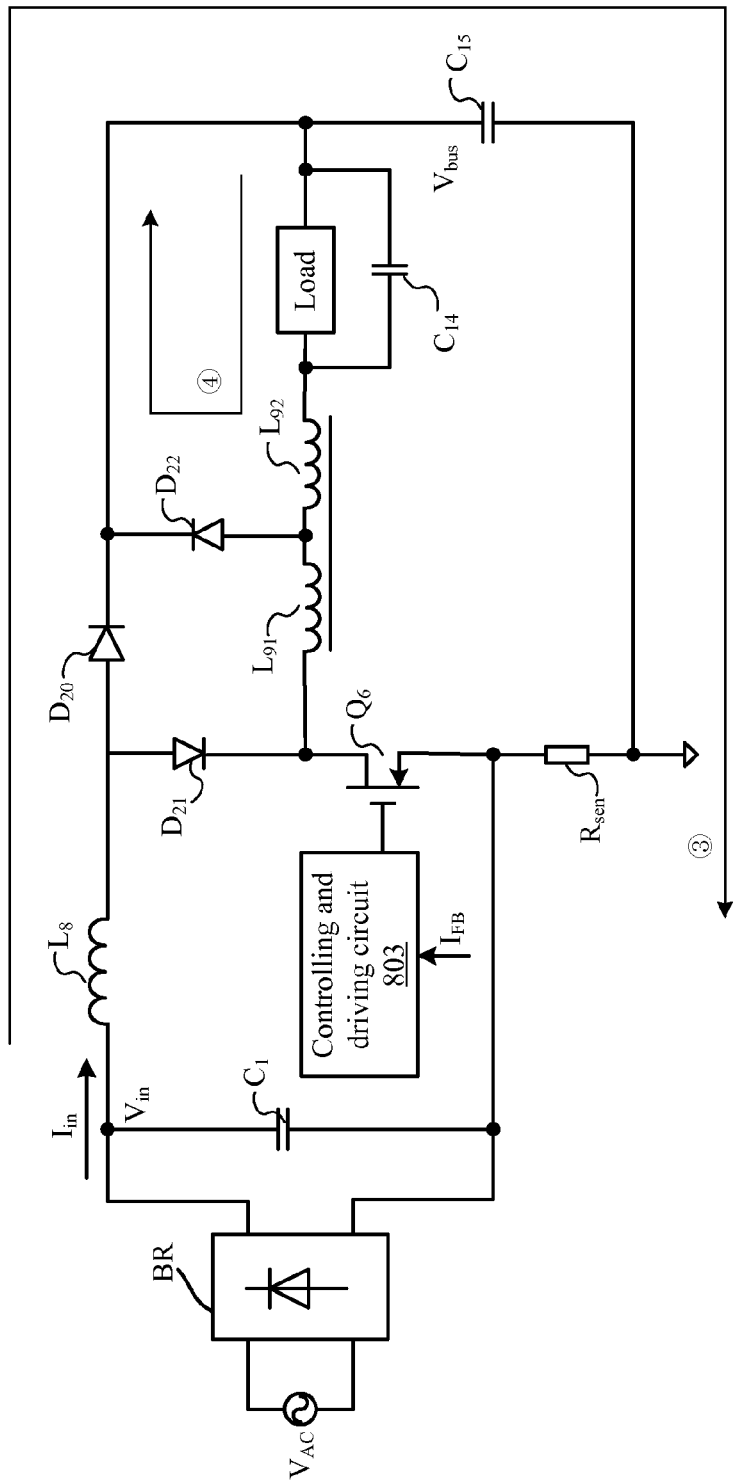
FIG. 8C shows an example conductive path in a second operation mode of the AC/DC power converter of FIG. 8A.

Referring now to FIG. 8C, shown is an example conductive path in a second operation mode of the AC/DC power converter of FIG. 8A. In the second operation mode, power switch $Q_6$ is turned off. In the third path, which can include inductor $L_8$, diode $D_{20}$, and capacitor $C_{15}$, the inductor current through inductor $L_8$ can continue to decrease to release energy to capacitor $C_{15}$ by charging. When the capacitance of capacitor $C_{15}$ is sufficiently large, voltage $V_{bus}$ across capacitor $C_{15}$ can be maintained as substantially constant with minimal fluctuation. Simultaneously, the inductor current of coupled inductors $L_{91}$ and $L_{92}$ can continue to decrease to release the energy to the load through the fourth path, which can include inductor $L_{92}$, diode $D_{22}$, and capacitor $C_{14}$.

The drop rate of the inductor current can be increased significantly due to the configuration of coupled inductor $L_{91}$ and $L_{92}$ to decrease the duration of the switching cycle. The circuit structure and the conductive paths of different operation modes of the AC/DC power converter of FIG. 8A have been described. The controlling principles of power factor correction and constant output electric signal of the AC/DC power converter of FIG. 8A will be described below.

Figure 9A:
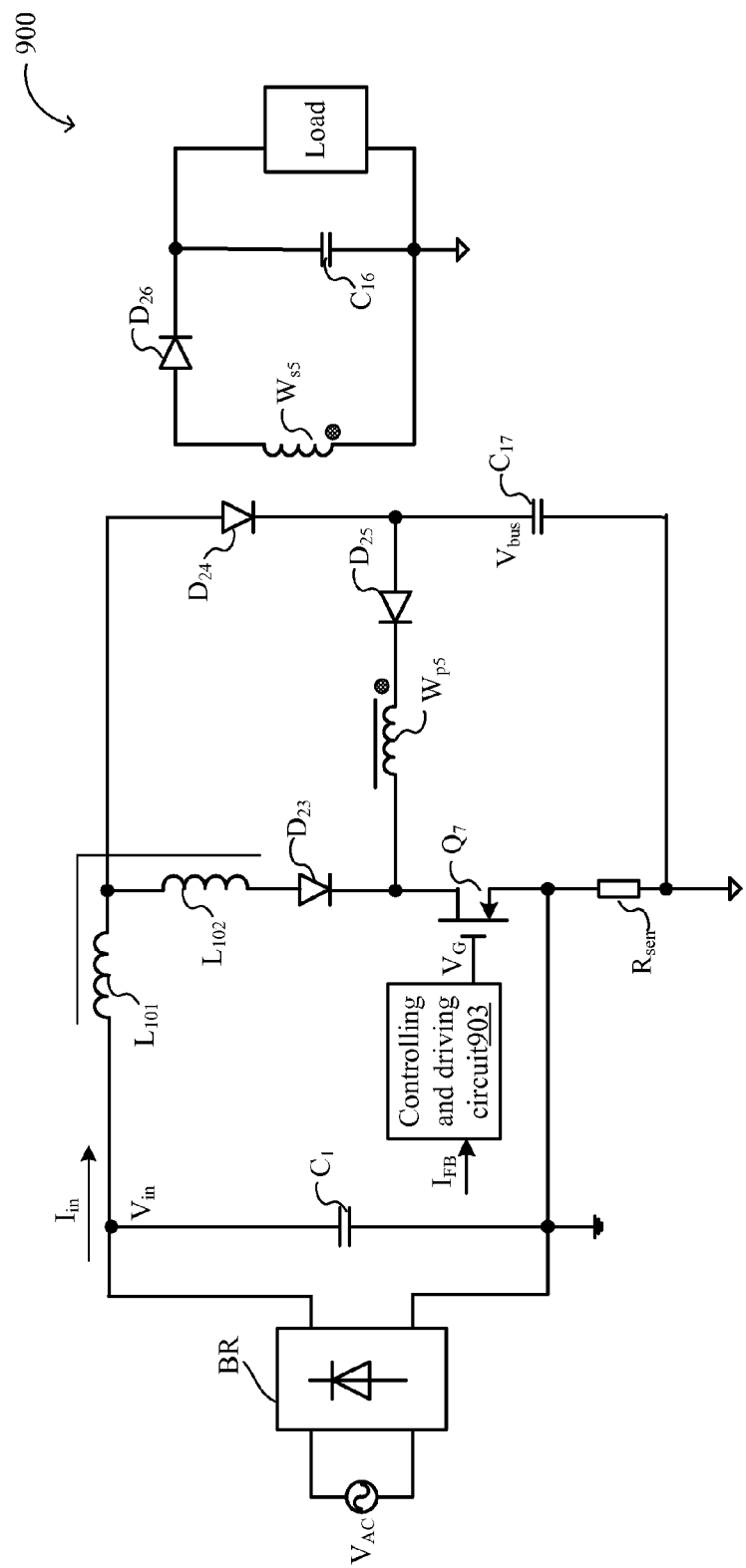
FIG. 9A shows a schematic diagram of a seventh example AC/DC power converter in accordance with embodiments of the present invention.

Referring now to FIG. 9A, shown is a schematic diagram of a seventh example AC/DC power converter in accordance with embodiments of the present invention. AC/DC power converter 900 can include a coupled inductor including inductors $L_{101}$ and $L_{102}$ as the first energy storage component. Transformer $T_5$ can include primary winding $W_{p5}$ and secondary winding $W_{s5}$ as the second energy storage component, and capacitor $C_{17}$ can be configured as the third energy storage component. Also, a first path (denoted by an encircled 1), a second path (denoted by an encircled 2), a third path (denoted by an encircled 3), and a fourth path (denoted by an encircled 4), will be discussed with reference to FIG. 9C.

Here, the first and third paths can form a boost power stage to receive half-sinusoid DC input voltage $V_{in}$, and to generate a constant voltage $V_{bus}$ across capacitor $C_{15}$. The second and fourth paths can form a flyback power stage to receive voltage $V_{bus}$, and to generate constant output current $I_o$ to drive the load (e.g., LED lamps). Also, the boost power stage and the flyback power stage can share power switch $Q_7$ and controlling and driving circuit 903.

Figure 9B:
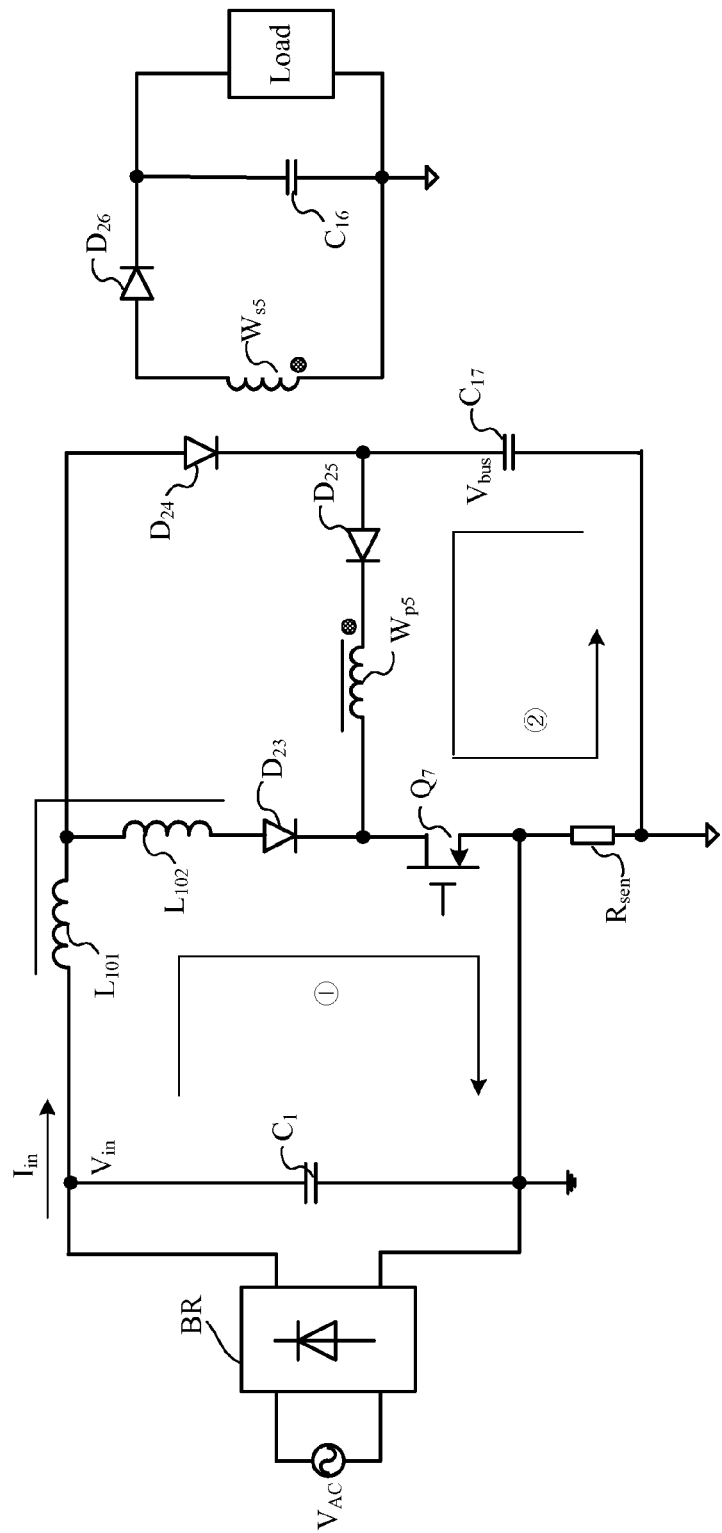
FIG. 9B shows an example conductive path in a first operation mode of the AC/DC power converter of FIG. 9A.

Referring now to FIG. 9B, shown is an example conductive path in a first operation mode of the AC/DC power converter of FIG. 9A. In the first operation mode, power switch $Q_7$ is turned on. Current through coupled inductors $L_{101}$ and $L_{102}$ can continue to increase to store energy in the first path, which can include coupled inductors $L_{101}$ and $L_{102}$, diode $D_{23}$, and power switch $Q_7$. Simultaneously, current through primary winding $W_{p5}$ can continue to increase in the second path, which can include capacitor $C_{17}$, diode $D_{25}$, primary winding $W_{p5}$, and power switch $Q_7$. Also, resistor $R_{sen}$ can be arranged between a common node of power switch $Q_6$ and in output terminal of rectifier bridge BR, and an equivalent potential can be included in the second path to accurately sense current through primary winding $W_{p5}$.

Figure 9C:
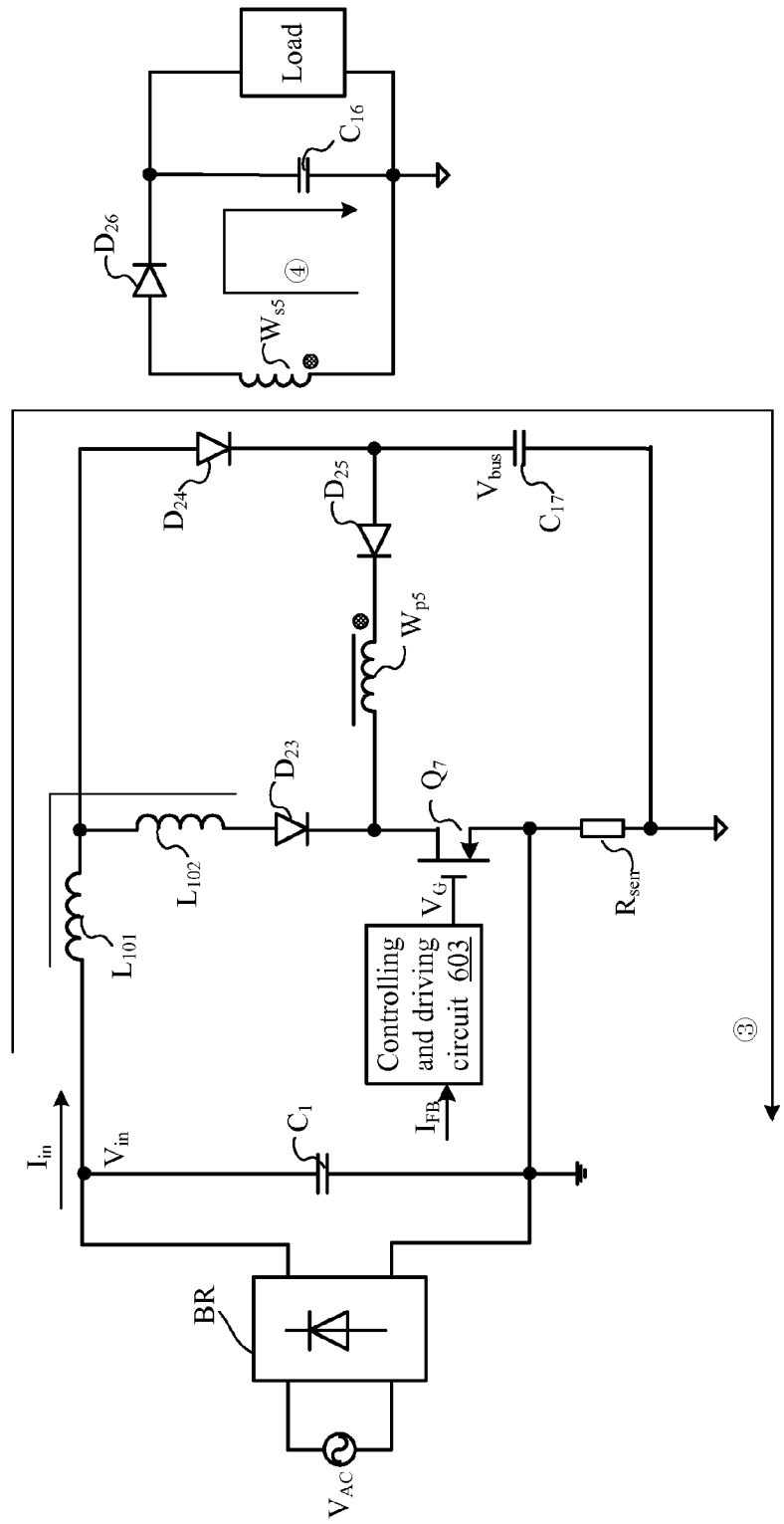
FIG. 9C shows an example conductive path in a second operation mode of the AC/DC power converter of FIG. 9A.

Referring now to FIG. 9C, shown is an example conductive path in a second operation mode of the AC/DC power converter of FIG. 9A. In the second operation mode, power switch $Q_7$ is turned off. In the third path, which can include inductor $L_{101}$, diode $D_{24}$, and capacitor $C_{17}$, the inductor current of inductor $L_{101}$ can continue to decrease to release energy to capacitor $C_{17}$ by charging. When the capacitance of capacitor $C_{17}$ is sufficiently large, voltage $V_{bus}$ across capacitor $C_{17}$ can be maintained as substantially constant with minimal fluctuation. Simultaneously, the inductor current of secondary winding $W_{s5}$ can continue to decrease to release the energy to the load through the fourth path, which can include secondary winding $W_{s5}$, diode $D_{26}$, and capacitor $C_{16}$.

The foregoing descriptions of specific embodiments of the present invention have been presented through images and text for purpose of illustration and description of the AC/DC power converter circuit and methods. They are not intended to be exhaustive or to limit the invention to the precise forms disclosed, and obviously many modifications and variations are possible in light of the above teaching, such as different converter topologies, and alternatives of the type of the power switch for different applications.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An AC/DC power converter, comprising:
   a) a rectifier bridge and a filter capacitor configured to convert an external AC voltage to a half-sinusoid DC input voltage;
   b) a first power stage having a first converter topology and being configured to receive said half-sinusoid DC input voltage, said first power stage comprising a first magnetic component, a capacitive component, a controlling and driving circuit, and a power transistor, wherein said first power stage is configured to provide power factor correction (PFC) of a first current flowing through said first magnetic component relative to said half-sinusoid DC input voltage; and
   c) a second power stage having a second converter topology and comprising a second magnetic component, said capacitive component, and said power transistor, wherein said second magnetic component comprises a transformer, wherein said capacitive component is common to said first and second power stages, and wherein said second power stage is configured to provide constant current regulation of an output current of said AC/DC power converter.

2. The AC/DC power converter of claim 1, further comprising a current sensing circuit configured to detect a second current in said second power stage, and to generate a feedback signal in a first operation mode.

3. The AC/DC power converter of claim 2, wherein said controlling and driving circuit is configured to generate a driving signal to drive said power transistor based on said feedback signal.

4. The AC/DC power converter of claim 1, wherein:
   a) said first magnetic component comprises a first inductor; and
   b) said second magnetic component comprises a second inductor.

5. The AC/DC power converter of claim 2, wherein:
   a) said power transistor is on when in said first operation mode; and
   b) said power transistor is off when in a second operation mode.

6. The AC/DC power converter of claim 1, further comprising a resistor coupled between said power transistor and ground.

7. The AC/DC power converter of claim 1, wherein each of said first and second power stages comprises a topology selected from: buck, boost, flyback, and boost-buck.

8. The AC/DC power converter of claim 1, wherein said output current is configured to drive a light-emitting diode (LED) load.

9. The AC/DC power converter of claim 8, wherein said LED load is coupled to said second magnetic component and said capacitive component.

10. The AC/DC power converter of claim 1, further comprising:
    a) a first diode having an anode coupled to said first magnetic component and a cathode coupled to a common node; and
    b) a second diode having an anode coupled to said second magnetic component and a cathode coupled to said common node.

11. The AC/DC power converter of claim 10, wherein said power transistor is coupled to said common node.

12. The AC/DC power converter of claim 10, further comprising a third diode having an anode coupled to said common node and a cathode coupled to said capacitive component.

13. The AC/DC power converter of claim 1, wherein said second magnetic component is configured to operate in a boundary conduction mode (BCM).

14. The AC/DC power converter of claim 1, wherein said first converter topology comprises a boost topology, and said second converter topology comprises a flyback topology.

15. The AC/DC power converter of claim 1, wherein said first converter topology comprises a buck-boost topology, and said second converter topology comprises a flyback topology.

16. The AC/DC power converter of claim 1, wherein said first converter topology comprises a boost topology, and said second converter topology comprises a buck topology.

17. The AC/DC power converter of claim 1, wherein said first converter topology comprises a flyback topology, and said second converter topology comprises a buck topology.

18. The AC/DC power converter of claim 1, further comprising:
    a) a first diode having an anode coupled to said first magnetic component and a cathode coupled to a common node; and
    b) a second diode having an anode coupled to said first magnetic component and a cathode coupled to said second magnetic component.

19. The AC/DC power converter of claim 18, wherein said capacitive component is coupled to said second magnetic component and ground.

* * * * *